(12) United States Patent
Isley, III et al.

(10) Patent No.: US 12,296,737 B1
(45) Date of Patent: May 13, 2025

(54) TORSION GUIDANCE LAUNCH AND RECOVERY SYSTEM AND METHOD

(71) Applicants: Joseph K. Isley, III, Fort Myers, FL (US); Joseph K Isley, IV, Fort Myers, FL (US); Sabrina I. Lundbohm, Fort Myers, FL (US)

(72) Inventors: Joseph K. Isley, III, Fort Myers, FL (US); Joseph K Isley, IV, Fort Myers, FL (US); Sabrina I. Lundbohm, Fort Myers, FL (US)

( * ) Notice: Subject to any disclaimer, the term of this patent is extended or adjusted under 35 U.S.C. 154(b) by 0 days.

(21) Appl. No.: 18/241,966

(22) Filed: Sep. 4, 2023

Related U.S. Application Data

(62) Division of application No. 16/290,267, filed on Mar. 1, 2019, now Pat. No. 11,745,637.

(60) Provisional application No. 62/637,590, filed on Mar. 2, 2018.

(51) Int. Cl.
  *B60P 3/10* (2006.01)

(52) U.S. Cl.
  CPC ........... *B60P 3/1075* (2013.01); *B60P 3/1066* (2013.01)

(58) Field of Classification Search
  CPC ..... B60P 3/1058; B60P 3/1075; B60P 3/1033; B60P 3/1066
  USPC ...................................................... 280/414.1
  See application file for complete search history.

(56) References Cited

U.S. PATENT DOCUMENTS

| | | | | |
|---|---|---|---|---|
| 2,960,246 | A * | 11/1960 | Lovelace | B60P 3/1033 414/536 |
| 3,263,845 | A * | 8/1966 | Davidson | B60P 3/1066 414/559 |
| 3,303,952 | A * | 2/1967 | Harry | B60P 3/1066 414/812 |
| 3,363,789 | A * | 1/1968 | Lange | B60P 3/1033 414/495 |
| 3,438,524 | A * | 4/1969 | Snodgrass | B60P 3/1058 414/532 |
| 3,595,598 | A * | 7/1971 | Nuzum | B60P 3/073 410/23 |
| 3,632,138 | A * | 1/1972 | Whiteley, Jr. | B60P 3/1033 414/467 |
| 3,827,717 | A * | 8/1974 | Whitley, Jr. | B60P 3/1033 410/2 |
| 3,931,986 | A * | 1/1976 | Hunziker | B60P 3/1033 414/458 |
| 4,114,920 | A * | 9/1978 | Boettcher | B60P 3/1033 414/529 |
| 4,193,610 | A * | 3/1980 | Miller, III | B60P 3/1033 280/414.1 |
| 4,626,162 | A * | 12/1986 | Parisi | B60P 3/1058 414/479 |

(Continued)

OTHER PUBLICATIONS https://www.overtons.com/trailering/trailer-guides-guide-ons/post-guide-onS, Apr. 16, 2019.

(Continued)

*Primary Examiner* — Hilary L Gutman

(74) *Attorney, Agent, or Firm* — Frijouf, Rust & Pyle, P.A.

(57) ABSTRACT

A vessel controlling device for positioning a vessel includes a base for supporting the vessel. A primary guide is coupled to the base. A secondary guide is couple to the base. The vessel impacts with the primary guide and thesecondary guide. The primary guide and thesecondary guide direct the vessel towardsthecenter of the base during launching and recovering the vessel relative to the base.

2 Claims, 31 Drawing Sheets

(56) References Cited

U.S. PATENT DOCUMENTS

| | | | | |
|---|---|---|---|---|
| 5,320,058 | A * | 6/1994 | Reed | B60P 3/1033 |
| | | | | 114/344 |
| 6,904,861 | B1 * | 6/2005 | Warner | B60P 3/1075 |
| | | | | 114/344 |
| 9,056,574 | B2 * | 6/2015 | Kirchhan | B60P 3/1033 |
| 2005/0285370 | A1 * | 12/2005 | Ebbenga | B60P 3/1066 |
| | | | | 280/414.1 |
| 2018/0281658 | A1 * | 10/2018 | Thorley | B60P 3/1075 |

OTHER PUBLICATIONS https://www.overtons.com/smith-60-post-trailer-guide-ons-316844. html?cgid=post-guide-ons#start=2&cgid=post-guide-ons, Apr. 16, 2019.

\* cited by examiner

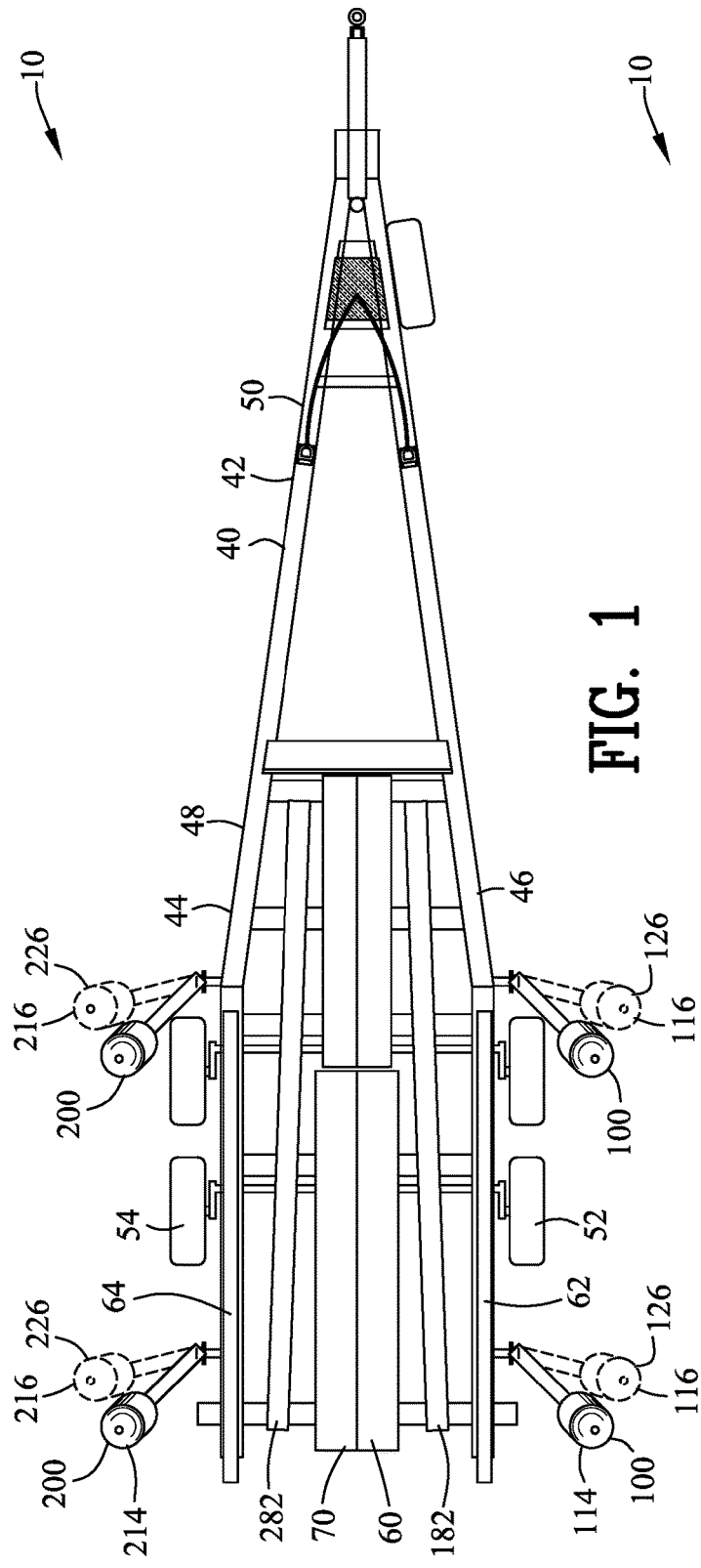
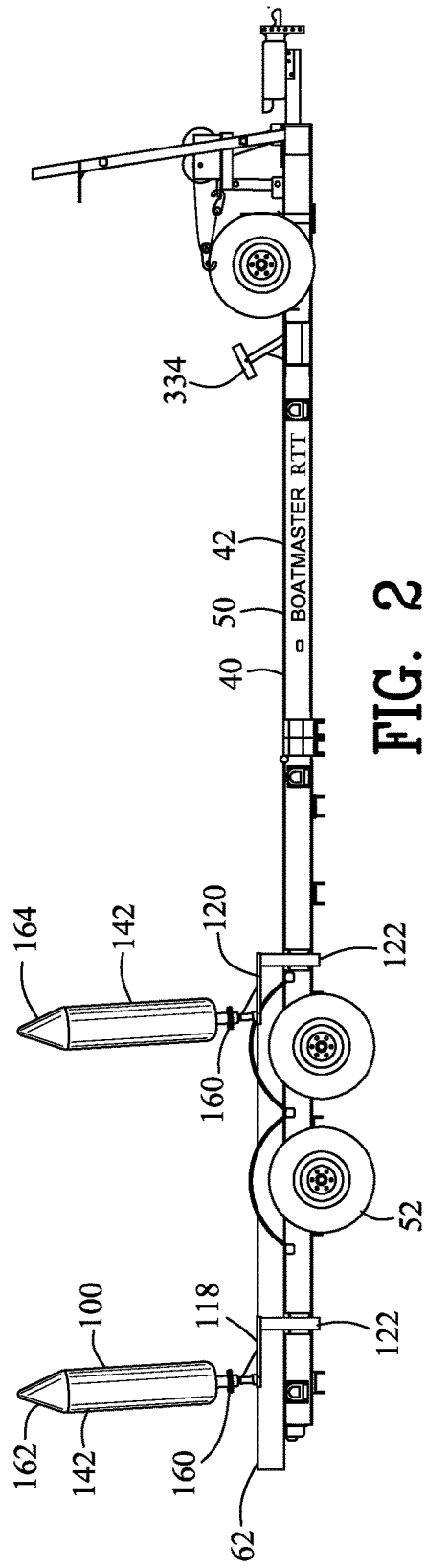
FIG. 1
FIG. 2

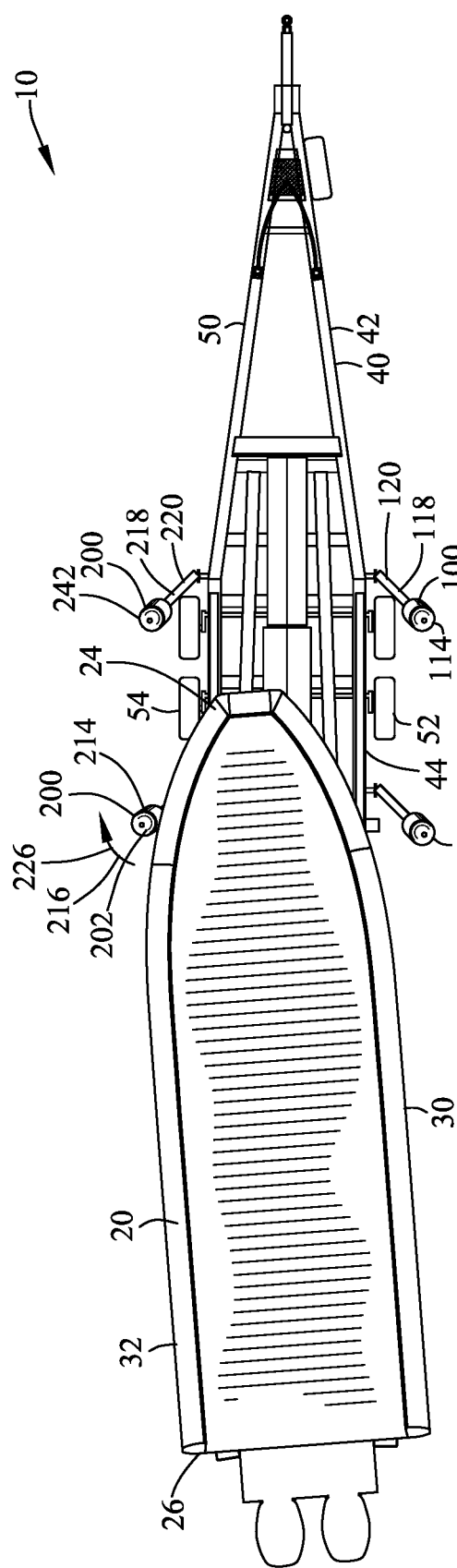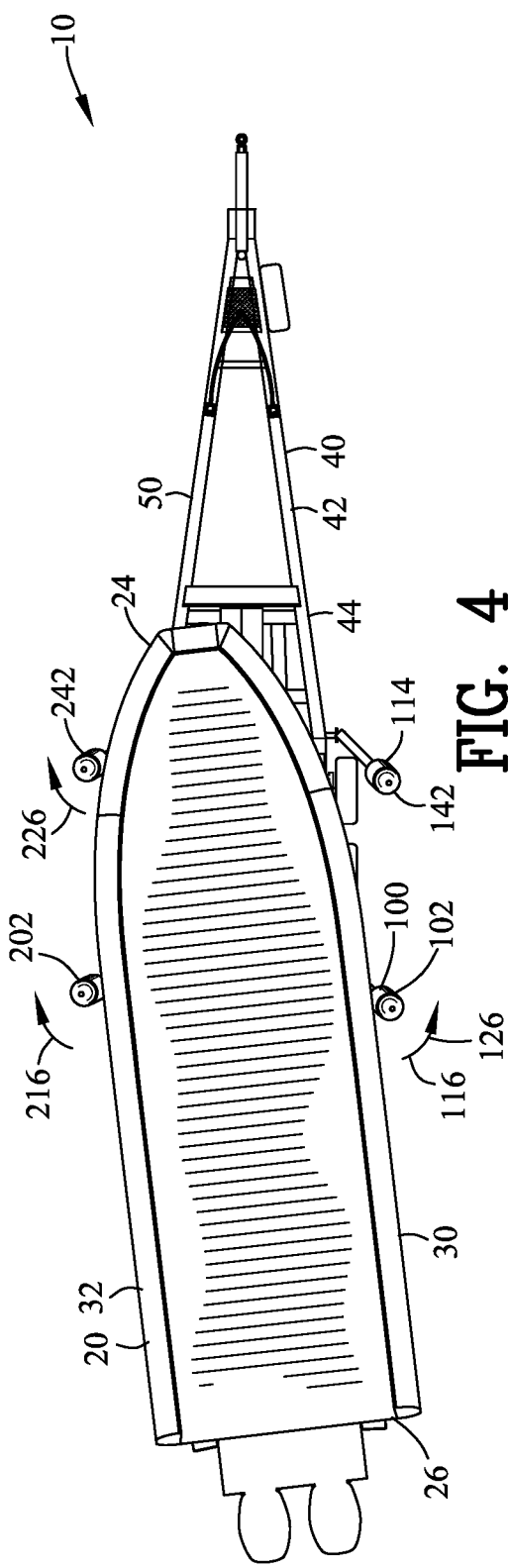
FIG. 3
FIG. 4

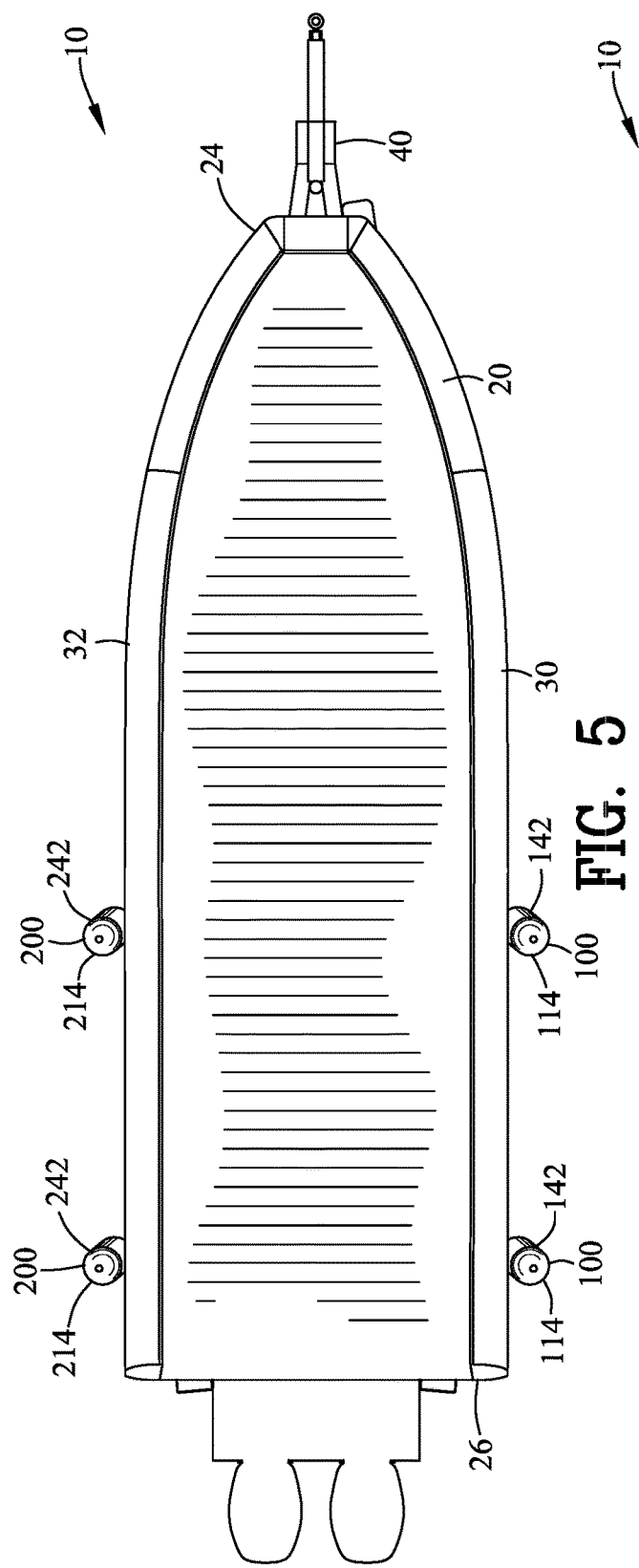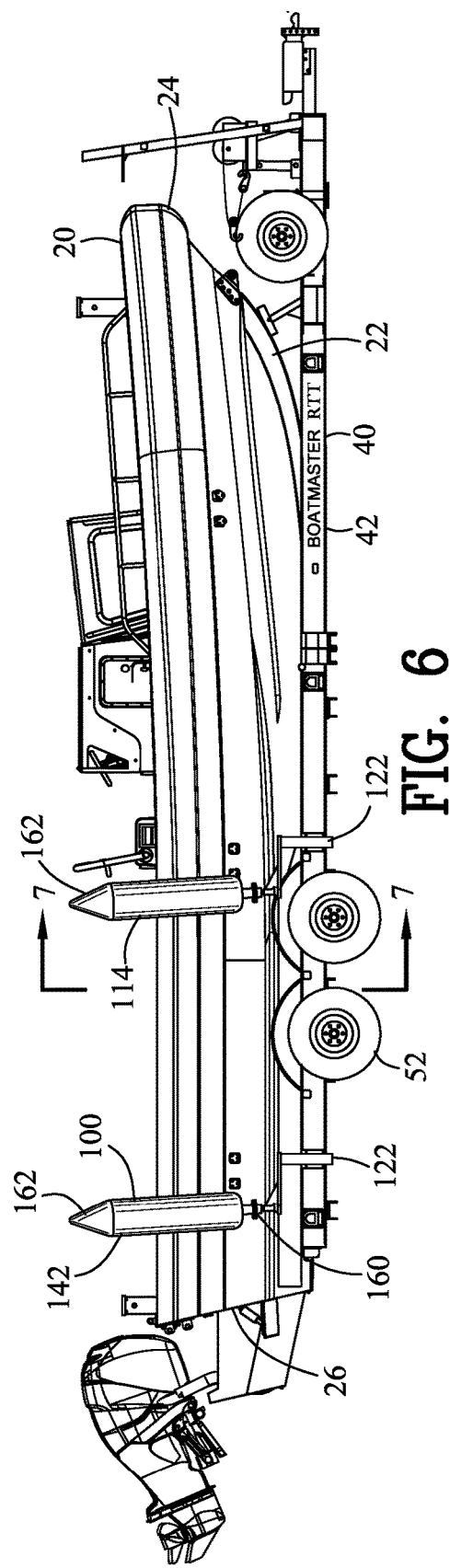

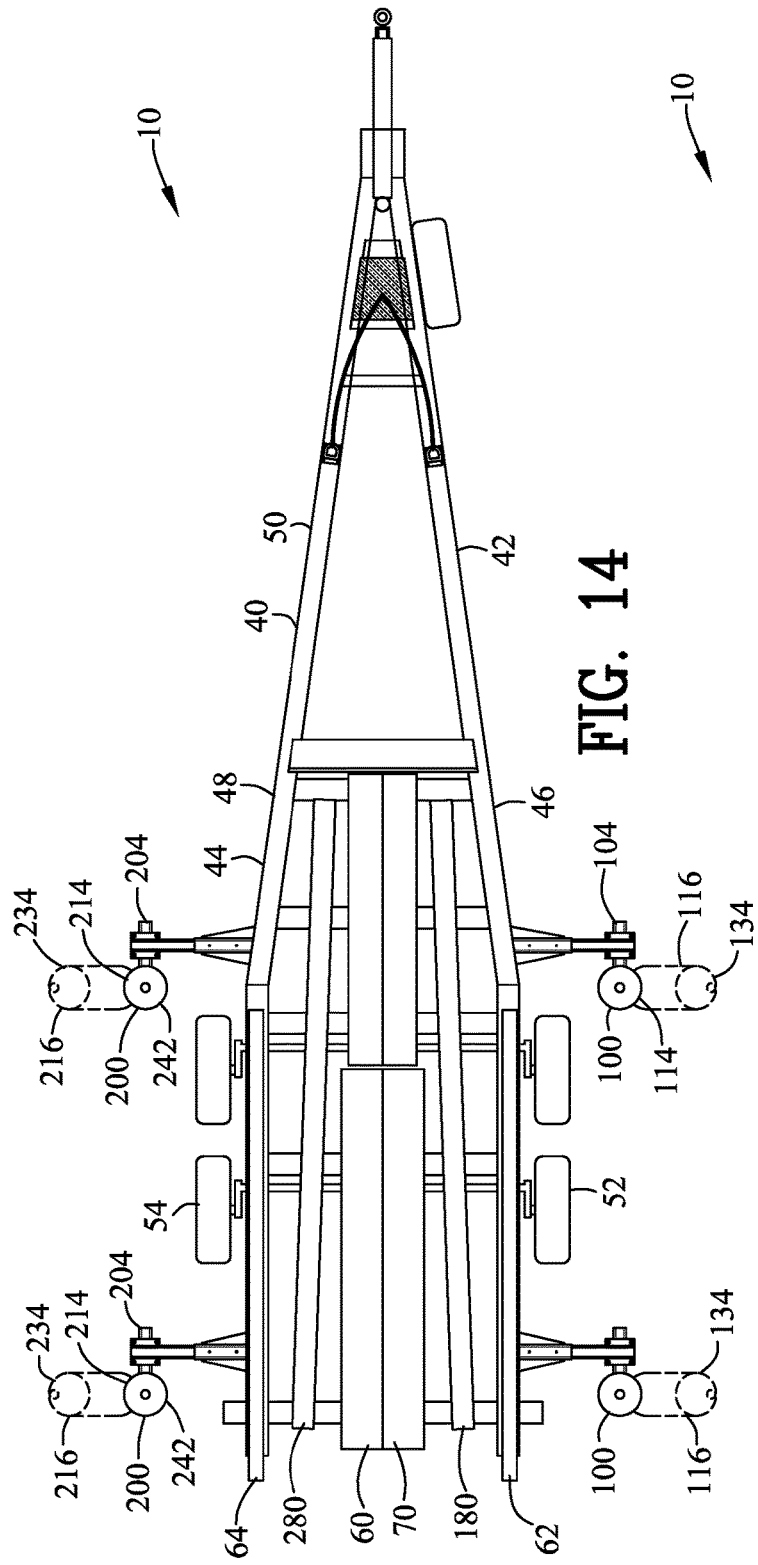
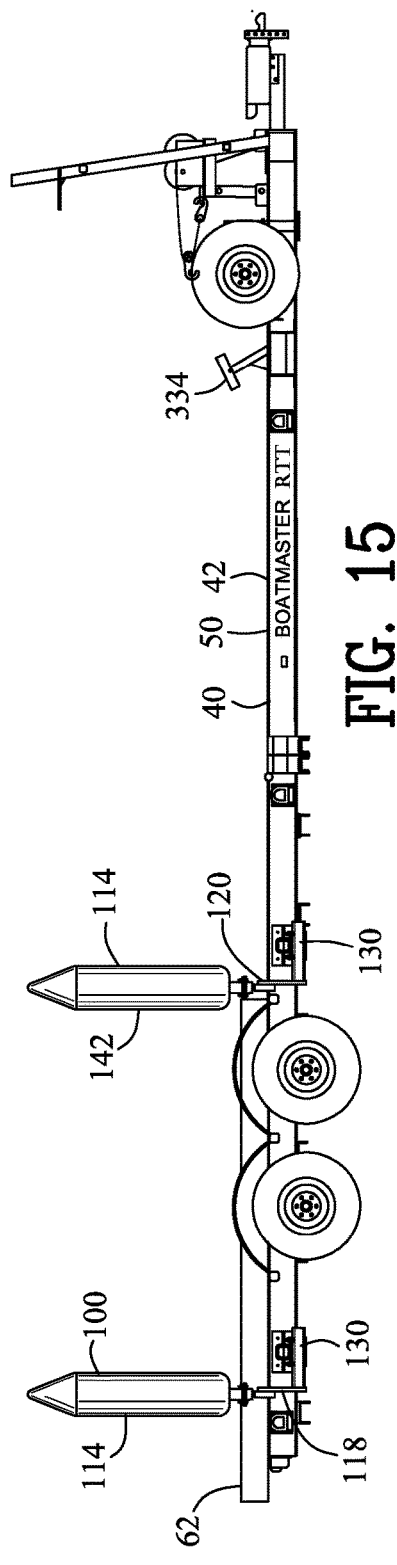
FIG. 14
FIG. 15

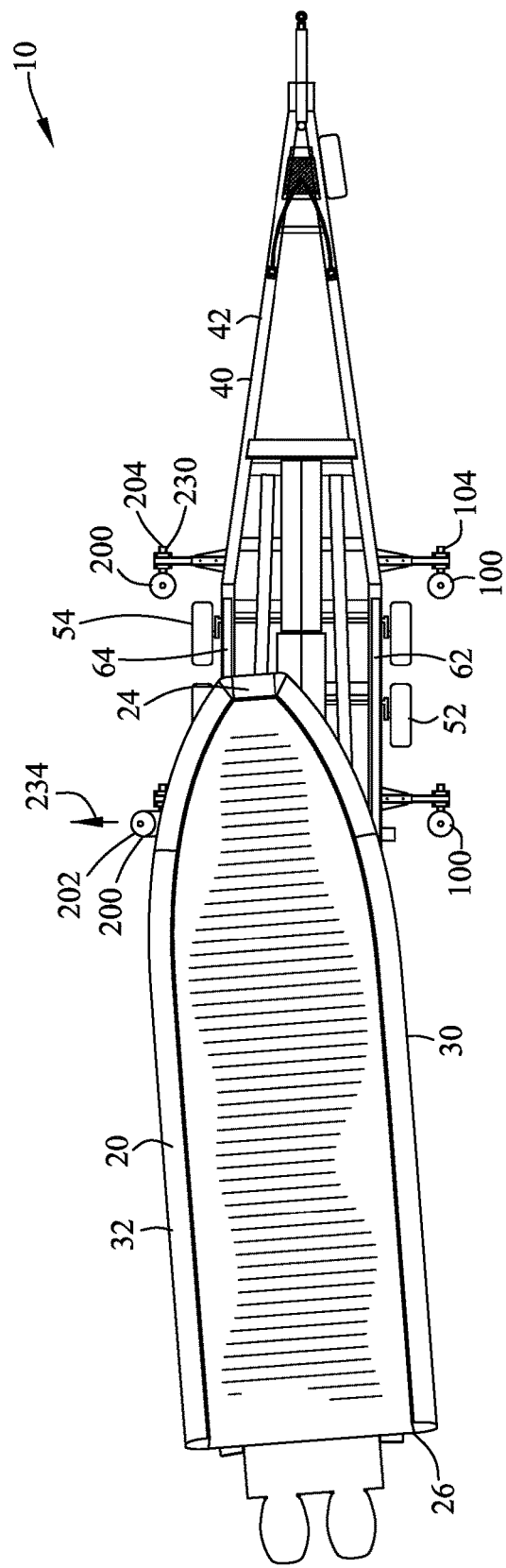

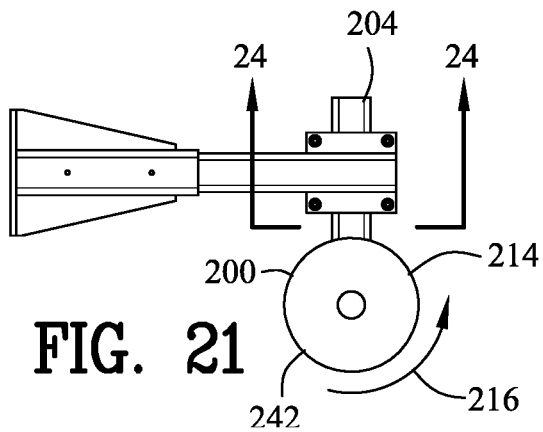
FIG. 21
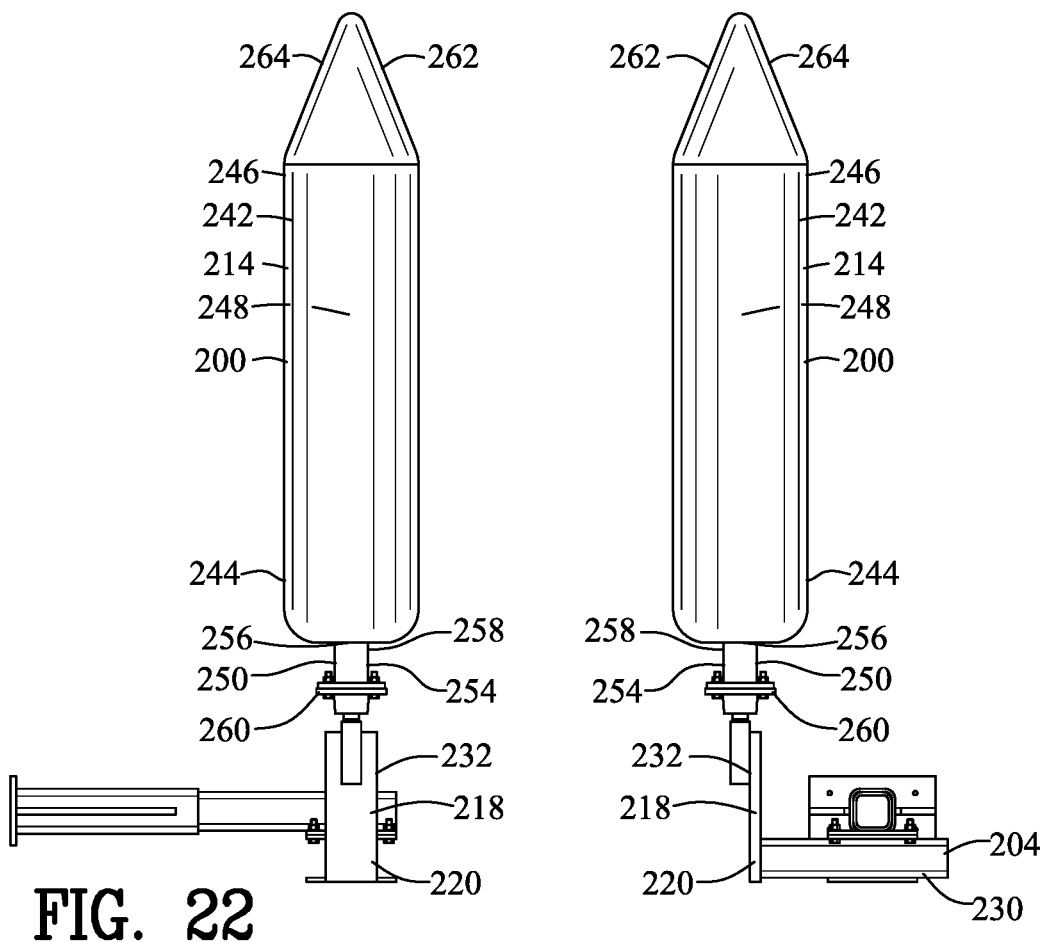
FIG. 22
FIG. 23
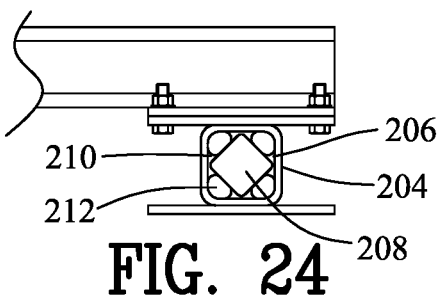
FIG. 24

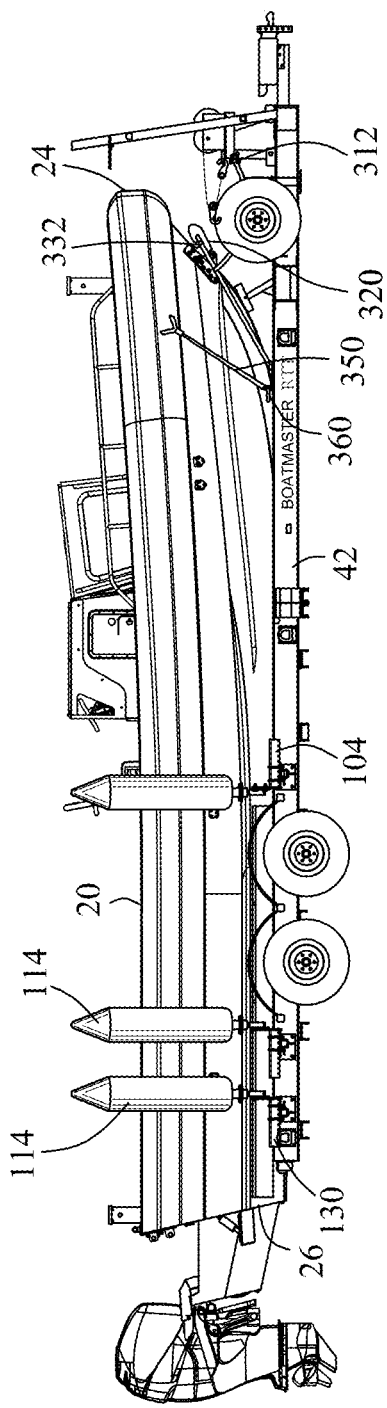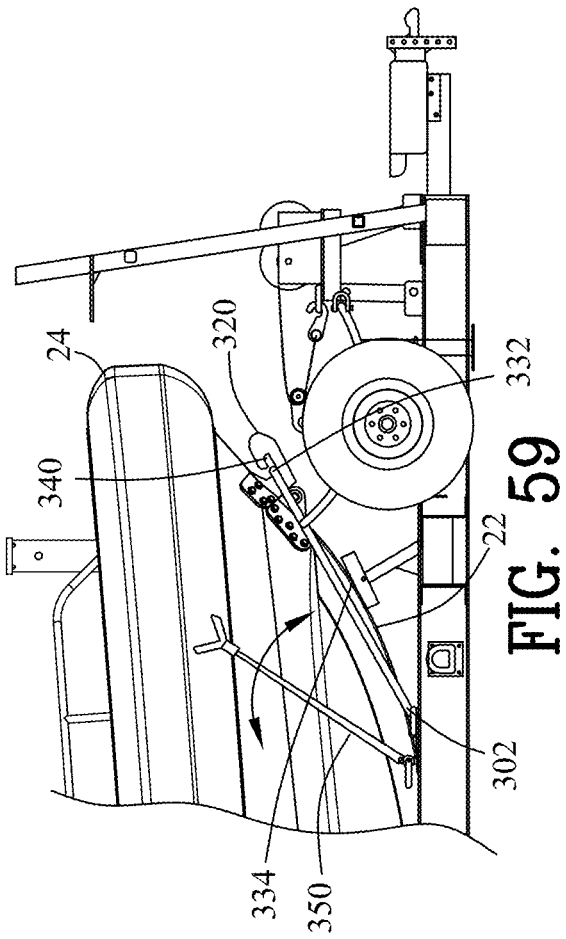

TORSION GUIDANCE LAUNCH AND RECOVERY SYSTEM AND METHOD

CROSS-REFERENCE TO RELATED APPLICATIONS

This application is a divisional patent application of U.S. patent application Ser. No. 16/290,267 filed Mar. 1, 2019. All subject matter set forth in application Ser. No. 16/290,267 is hereby incorporated by reference into the present application as if fully set forth herein.

U.S. patent application Ser. No. 16/290,267 filed Mar. 1, 2019 claims benefit of U.S. Patent Provisional Application No. 62/637,590 filed Mar. 2, 2018. All subject matter set forth in Provisional Application No. 62/637,590 is hereby incorporated by reference into the present application as if fully set forth herein.

BACKGROUND OF THE INVENTION

Field of the Invention

This invention relates to controlling devices and more particularly to a vessel controlling device for positioning a vessel.

Background of the Invention

In order to facilitate the transportation of a vessel, the vessel may be launched and recovered from a rigid surface. One such rigid surface may include a trailer. Alternatively, the rigid surface may include a stern launching ramp deployed from an amphibious ship or other large vessels. Properly aligning the vessel in relation to the rigid surface may become problematic due to wind, current, waves, speed and direction of the vessel or other factors. If during the launching or recovering of the vessel from the rigid surface the vessel is improperly aligned with the rigid surface, damage may be inflicted on the vessel and or the rigid surface. Furthermore if during the launching or recovering of the vessel from the rigid surface the vessel is improperly aligned with the rigid surface, injury to any individuals occupying the vessel or surrounding the rigid surface may be incurred. As such, properly aligning the vessel during launching and recovering in relation to the rigid surface may have extreme importance.

There have been many in the prior art who have attempted to solve these problems with varying degrees of success. None, however completely satisfies the requirements for a complete solution to the aforestated problem.

One such example of a vessel aligning device includes a first elongated boat trailer guide and a second elongated boat trailer guide coupled on either side of the trailer. Another such example of a vessel aligning device includes a first guidepost and a second guidepost coupled on either side of the trailer.

Although the aforementioned prior art have contributed to the development of the art of vessel aligning devices none of these prior art patents have solved the needs of this art.

Therefore, it is an object of the present invention to provide an improved vessel controlling device for positioning a vessel during launching and recovering.

Another object of this invention is to provide an improved vessel controlling device that provides a progressively increased counteracted force for centering the vessel on the rigid surface.

Another object of this invention is to provide an improved vessel controlling device that provides a forward vessel break and a rearward vessel break once the vessel has been properly aligned with the rigid surface.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

The present invention is defined by the appended claims with specific embodiments being shown in the attached drawings. For the purpose of summarizing the invention, the invention relates to a vessel controlling device for a vessel. The vessel controlling device may include a base for supporting the vessel. A primary torsion guide is coupled to the base. A secondary torsion guide is coupled to the base. The primary torsion guide and the secondary torsion guide define a base center on the base and between the primary torsion guide and the secondary torsion guide. The primary torsion guide is displaced outwardly from the base center upon the vessel impacting with the primary portion guide and the primary torsion guide provides a primary progressive increasing counteracted force for pushing the vessel toward the base center. The secondary torsion guide is displaced outwardly from the base center upon the vessel impacting with the secondary portion guide and the secondary torsion guide provides a secondary progressive increasing counteracted force for pushing the vessel toward the base center. The primary torsion guide and the secondary torsion guide align the vessel with the base center of the base during launching and recovering the vessel relative to the base.

In a more specific embodiment of the invention, the primary torsion guide may include a primary body coupled to the base. The primary body defines a primary chamber. A primary finger is positioned within the primary chamber of the primary body. The primary body and the primary finger define a plurality of primary voids between the primary body and the primary finger. A plurality of deformable primary members are positioned within the plurality of primary voids. A primary upright is coupled to the primary finger. The primary upright is displaced outwardly from the base center upon the vessel impacting with the primary upright. The primary progressive increasing counteracted force is defined by a rotational displacement of the primary finger relative to the primary body and results in the plurality of deformable primary members being compressed within the plurality of primary voids and between the primary body and the primary finger. The secondary torsion guide includes a secondary body coupled to the base. The secondary body defines a secondary chamber. A secondary finger is positioned within the secondary chamber of the secondary body. The secondary body and the secondary finger define a plurality of secondary voids between the secondary body and the secondary finger. A plurality of deformable secondary members are positioned within the plurality of secondary voids. A secondary upright is coupled to the secondary finger. The secondary upright is displaced outwardly from the base center upon the vessel impacting with the secondary upright. The secondary progressive increasing counteracted force is defined by a rotational displacement of the secondary finger relative to the secondary body and results in the plurality of deformable secondary members being compressed within the plurality of secondary voids and between the secondary body and the secondary finger.

In one embodiment of the invention, the vessel controlling device includes a primary guide body coupled to the base. A secondary guide body is couple to the base. The primary guide body and the secondary guide body defining a base center on the base and between the primary guide body and the secondary guide body. The primary guide body defines a primary angle relative to the base. The secondary guide body defines a secondary angle relative to the base. The primary angle and the secondary angle define an obtuse angle between the primary guide body and the secondary guide body. The primary angle of the primary guide body redirects the vessel towards the base center upon the vessel impacting with the primary guide body. The primary guide body permits a primary low friction coefficient with the vessel during a lateral engagement between the primary guide body and the vessel and promotes the vessel to travel relative to the base during engagement with the primary guide body. The secondary angle of the secondary guide body redirects the vessel towards the base center upon the vessel impacting with the secondary guide body. The secondary guide body permits a secondary low friction coefficient with the vessel during a lateral engagement between the secondary guide body and the vessel and promotes the vessel to travel relative to the base during engagement with the secondary guide body.

In another embodiment of the invention, the vessel controlling device includes a forward retainer cord extending from a primary end to a secondary end. The primary end and the secondary end of the forward retainer cord are coupled to the base for defining a contact cord region elevated above the base. A rearward retainer cord extends from a primary end to a secondary end. The primary end of the rearward retainer cord is coupled to the base and the secondary end of the rearward retainer cord is coupled to the forward retainer cord. A hook is coupled the vessel. The hook engages the contact cord region for defining a forward capture lock during forward displacement of the vessel over the base. The forward retaining cord terminates forward displacement of the vessel over the base for defining a forward vessel break. The hook engages the contact cord region for defining a rearward capture lock by a rearward displacement of the vessel over the base. The rearward retaining cord terminates a rearward displacement of the vessel over the base for defining a rearward vessel break.

The invention is also incorporated into the method of positioning a vessel comprising the steps of displacing a primary torsion guide outwardly upon the vessel impacting with the primary portion guide and the primary torsion guide providing a primary progressive increasing counteracted force for pushing the vessel inwardly. The secondary torsion guide is displaced outwardly upon the vessel impacting with the secondary portion guide and the secondary torsion guide providing a secondary progressive increasing counteracted force for pushing the vessel inwardly. The vessel is aligned by the primary torsion guide and the secondary torsion guide during launching and recovering the vessel.

The foregoing has outlined rather broadly the more pertinent and important features of the present invention in order that the detailed description that follows may be better understood so that the present contribution to the an can be more fully appreciated. Additional features of the invention will be described hereinafter which form the subject of the claims of the invention. It should be appreciated by those skilled in the an that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a top view of a first embodiment of a vessel controlling device of the present invention;

FIG. 2 is a front of FIG. 1;

FIG. 3 is a view similar to FIG. 1 illustrating the vessel having a first angular configuration relative to a trailer wherein the vessel is impacting with a torsion guide on the left side of the trailer and the torsion guide being outwardly displaced in a horizontal arcuate path;

FIG. 4 is a view similar to FIG. 3 illustrating the vessel having a second angular configuration relative to a trailer wherein the vessel is impacting with a plurality of torsion guides on the left side of the trailer and a single torsion guide on the right side of the trailer and the torsion guides being outwardly displaced in horizontal arcuate paths;

FIG. 5 is a view similar to FIG. 4 illustrating the vessel fully engaged with the trailer and illustrating the plurality of torsion guides on the left and the plurality of torsion guides on the right side of the trailer slightly compressing against the vessel;

FIG. 6 is a front view of FIG. 5;

FIG. 14 is a top view of a second embodiment of a vessel controlling device of the present invention;

FIG. 15 is a front of FIG. 14;

FIG. 16 is a view similar to FIG. 14 illustrating the vessel having a first angular configuration relative to a trailer wherein the vessel is impacting with a torsion guide on the left side of the trailer and the torsion guide being outwardly displaced in a vertical arcuate path;

FIG. 17 is a view similar to FIG. 16 illustrating the vessel having a second angular configuration relative to a trailer wherein the vessel is impacting with a single torsion guide on the left side of the trailer and a single torsion guide on the right side of the trailer and the torsion guides being outwardly displaced in a vertical arcuate path;

FIG. 21 is an enlarged top view of the torsion guide in FIG. 14;

FIG. 22 is a front view of FIG. 21;

FIG. 23 is a right side view of FIG. 21;

FIG. 24 is a sectional view along line 24-24 in FIG. 21 illustrating a plurality of deformable members in a non-compressed state;

FIG. 58 is a view similar to FIG. 56 illustrating the vessel further displaced along the trailer and a hook coupled to the vessel contacting the forward retainer cord;

FIG. 59 is an enlarged portion of FIG. 58 illustrating the forward retainer cord terminating forward displacement of the vessel relative to the trailer;

Similar reference characters refer to similar parts throughout the several Figures of the drawings.

DETAILED DISCUSSION

Figure 61:
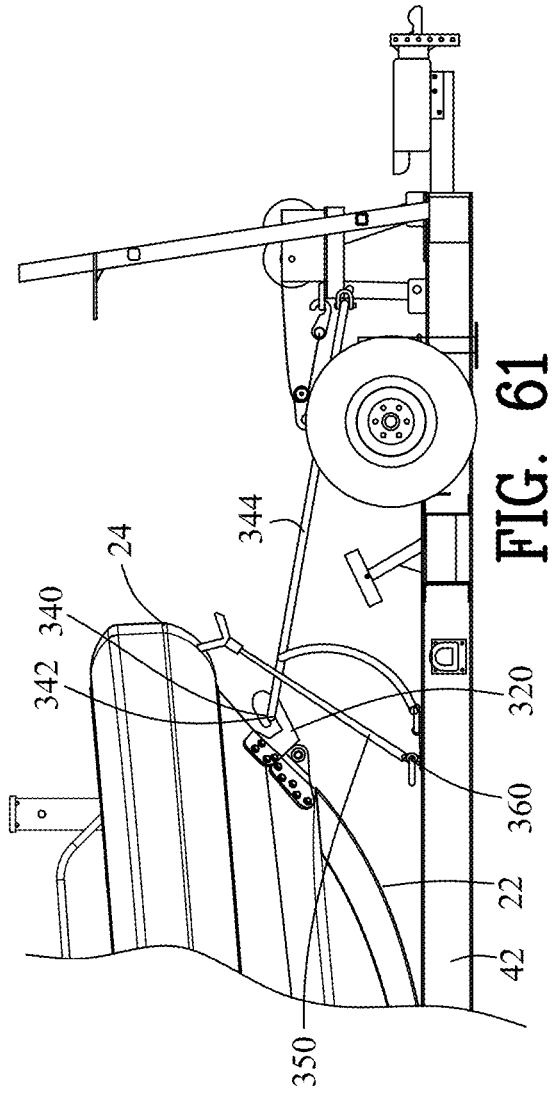
FIG. 61 is an enlarged portion of FIG. 60 illustrating the rearward retainer cord terminating rearward displacement of the vessel relative to the trailer.

FIGS. 1-61 illustrate a vessel controlling device 10 for positioning a vessel 20. The vessel 20 includes a hull 22 having a bow 24 and a stern 26. The vessel 20 has a starboard side 30 and a port side 32.

Figure 50:
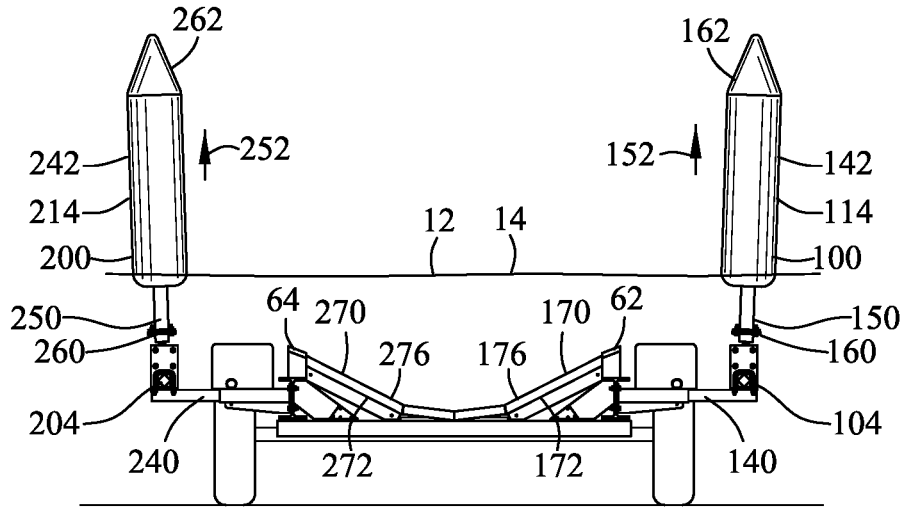
FIG. 50 is a view similar to FIG. 39 illustrating the deformable collars being vertically adjustable relative to the trailer by an elevational linkage.

The vessel controlling device 10 may be coupled to a base 40. The base 40 supports the vessel 20 while removed of a body of water 12 (FIG. 50). The base 40 may include a trailer 42. The trailer 42 includes a trailer frame 44 having a primary frame 46 and a secondary frame 48. A tongue 50 extends from the trailer frame 44. A primary wheel 52 is coupled to the primary frame 46 and a secondary wheel 54 is coupled to the secondary frame 48.

The trailer 42 may further include a center bunk 60 that is positioned on the trailer frame 40 between the primary frame 46 and the secondary frame 48. The trailer 42 may further include a primary bunk 62 positioned adjacent to the primary frame 46 and a secondary bunk 64 positioned adjacent to the secondary frame 48. The center bunk 60, the primary bunk 62 and the secondary bunk 64 may be constructed from ultrahigh molecular weight polyethylene.

Alternatively, the base 40 may include a stern launching ramp deployed from an amphibious ship or other large vessels. Furthermore, the trailer 42 may be secured to the stern launching ramp deployed from the amphibious ship or other large vessels during launching and recovering of the vessel relative to the water. More specifically, the trailer 42 may include a plurality of anchoring eyelets for receiving tie downs. The tie downs would extend and engage the stern launching ramp for securing the trailer 42 to the stern launching ramp.

The vessel controlling device 10 coupled to the trailer 42 may be beneficial wherein the trailer 42 is positioned on a boat ramps, beaches, riverbanks or other rough water access locations. The vessel control device 10 permits the vessel 22 to approach the base 40 at unusual side angles, speeds and environmental conditions and still be aligned properly with the base 40. For example, the vessel control device 10 allows the vessel 22 to approach the base 40 at increased speeds and at non-parallel angles relative to the base 40. In addition the vessel control device 10 permits the expedited alignment with the base 40 for rapidly coupling the vessel 22 to the base 40.

The vessel controlling device 10 assists in properly aligning the vessel related to a base 40. The proper alignment of the vessel 20 may become more problematic due to wind, current, waves, speed, the direction and speed of the vessel or other factors. The operator of the vessel 22 drives the vessel 22 under power aiming the bow in the center of the vessel controlling device 10.

The vessel controlling device 10 may include a primary torsion guide 100 coupled to the base 40. A secondary torsion guide 200 is coupled to the base 40. The primary torsion guide 100 and the secondary torsion guide 200 define a base center 70 on the base 40 and between the primary torsion guide 100 and the secondary torsion guide 200.

The primary torsion guide 100 is displaced outwardly from the base center 70 upon the vessel 20 impacting with the primary portion guide 100. The primary torsion guide 100 provides a primary progressive increasing counteracted force 102 for pushing the vessel 20 toward the base center 70. The secondary torsion guide 200 is displaced outwardly from the base center 70 upon the vessel 20 impacting with the secondary portion guide 200. The secondary torsion guide 200 provides a secondary progressive increasing counteracted force 202 for pushing the vessel 20 toward the base center 70. The primary torsion guide 100 and the secondary torsion guide 200 align the vessel 20 with the base center 70 of the base 40 during launching and recovering the vessel 20 relative to the base 40.

Figure 7:
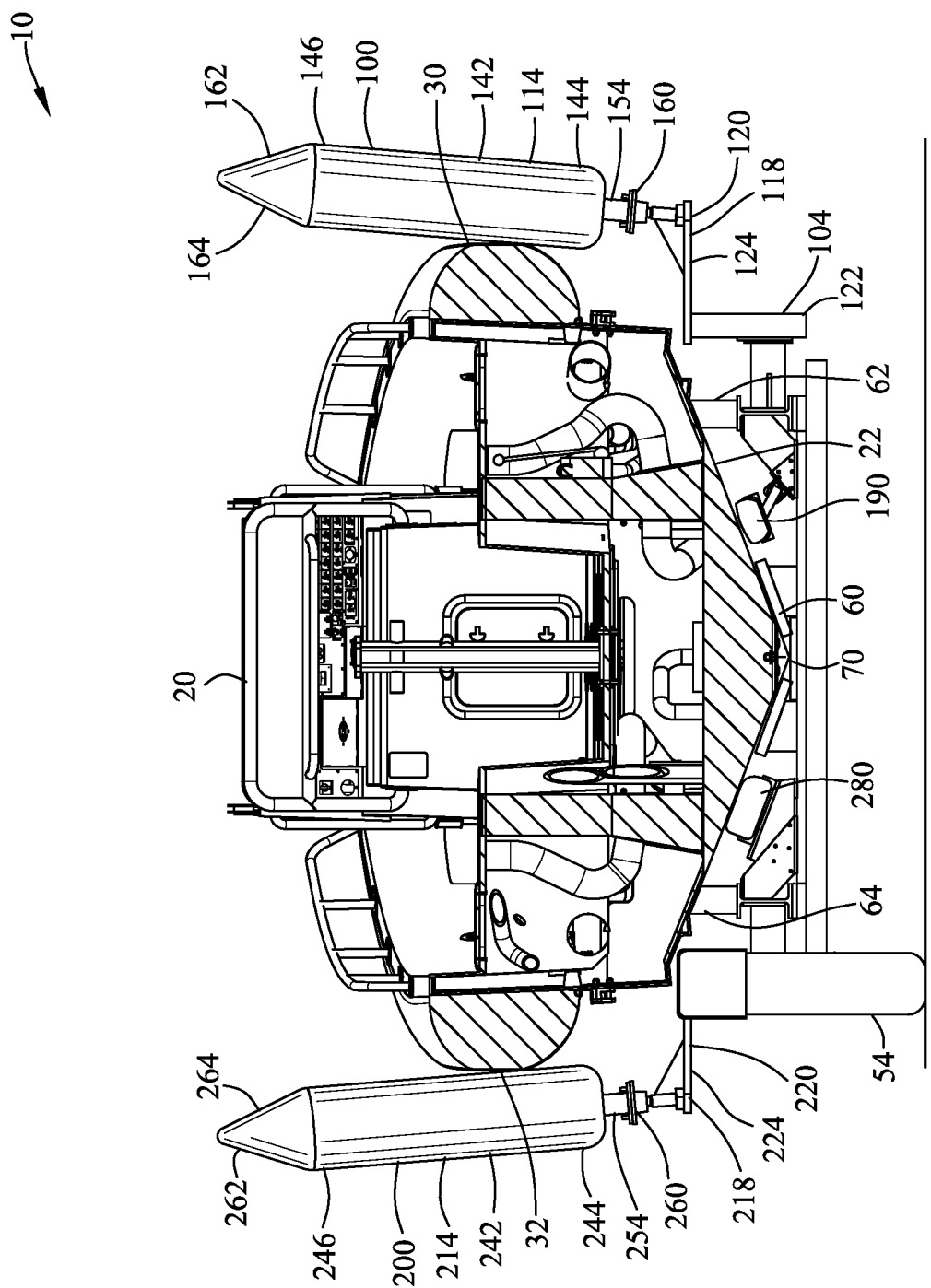
FIG. 7 is a sectional view along line 7-7 in FIG. 6.
Figure 8:
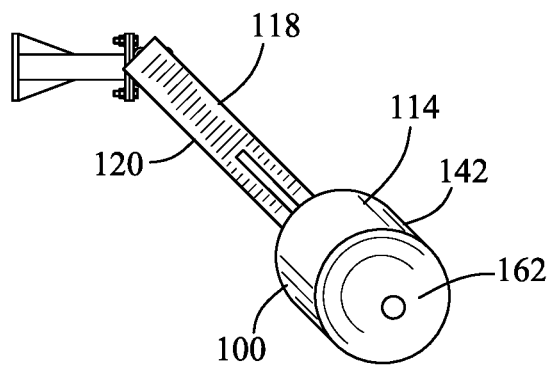
FIG. 8 is an enlarged top view of the torsion guide in FIG. 1.
Figures 9, 10:
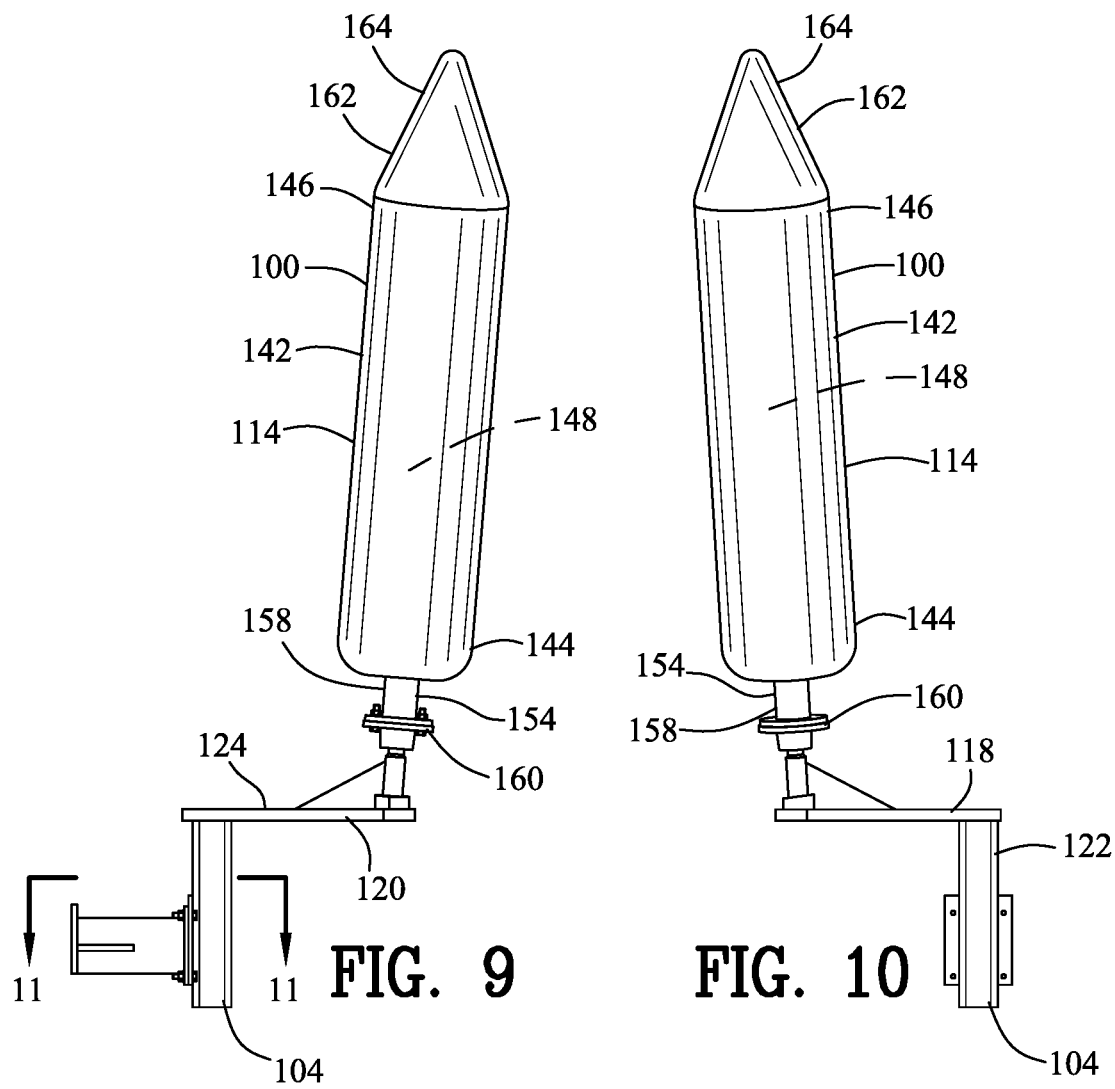
FIG. 9 is a front view of FIG. 8.
FIG. 10 is a right side view of FIG. 8.
Figure 11:
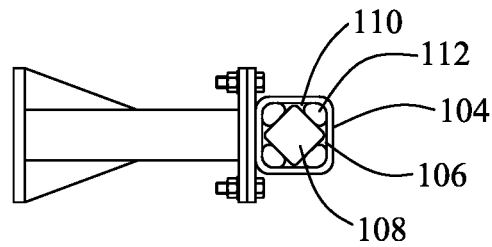
FIG. 11 is a sectional view along line 11-11 in FIG. 9 illustrating a plurality of deformable members in a non-compressed state.
Figure 12:
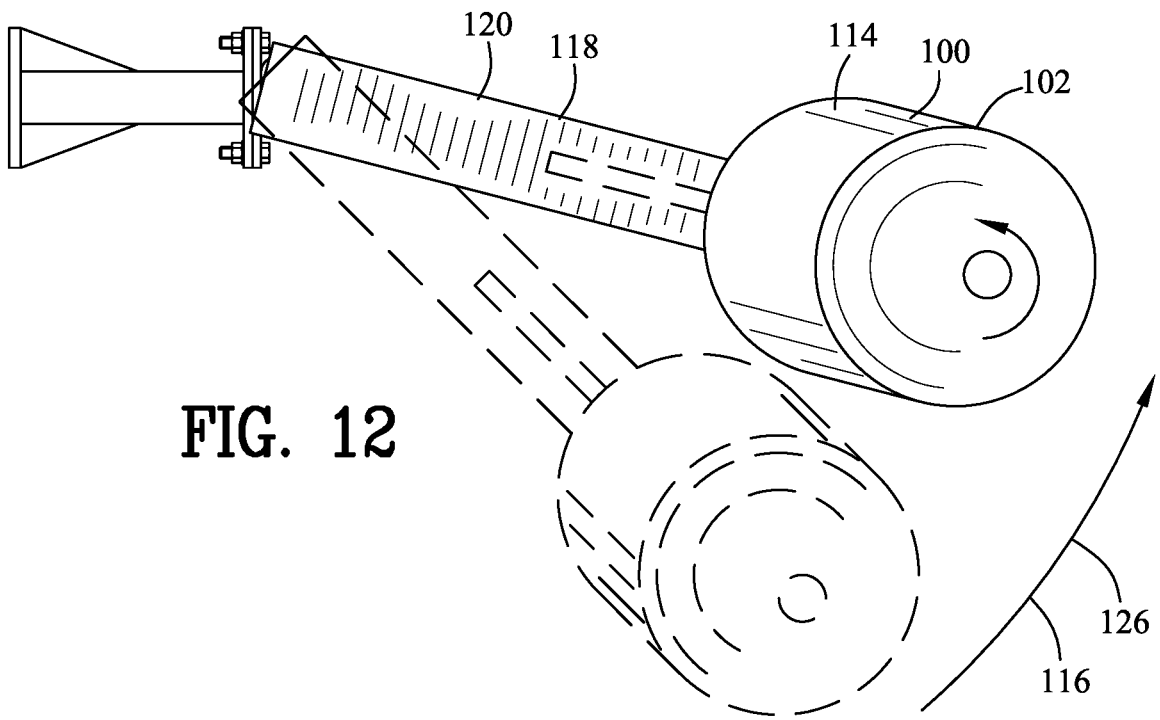
FIG. 12 is an enlarged view of FIG. 8 illustrating the torsion guide being outwardly displaced and rotationally displaced.
Figure 13:
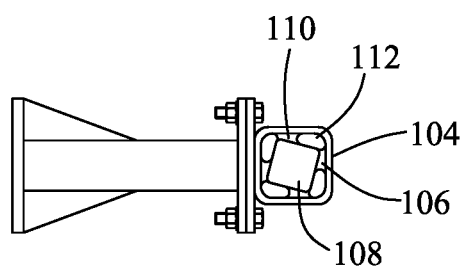
FIG. 13 is a partial bottom view of FIG. 12 illustrating the plurality of deformable members in a compressed state upon the torsion guide being outwardly displaced.
Figure 18:
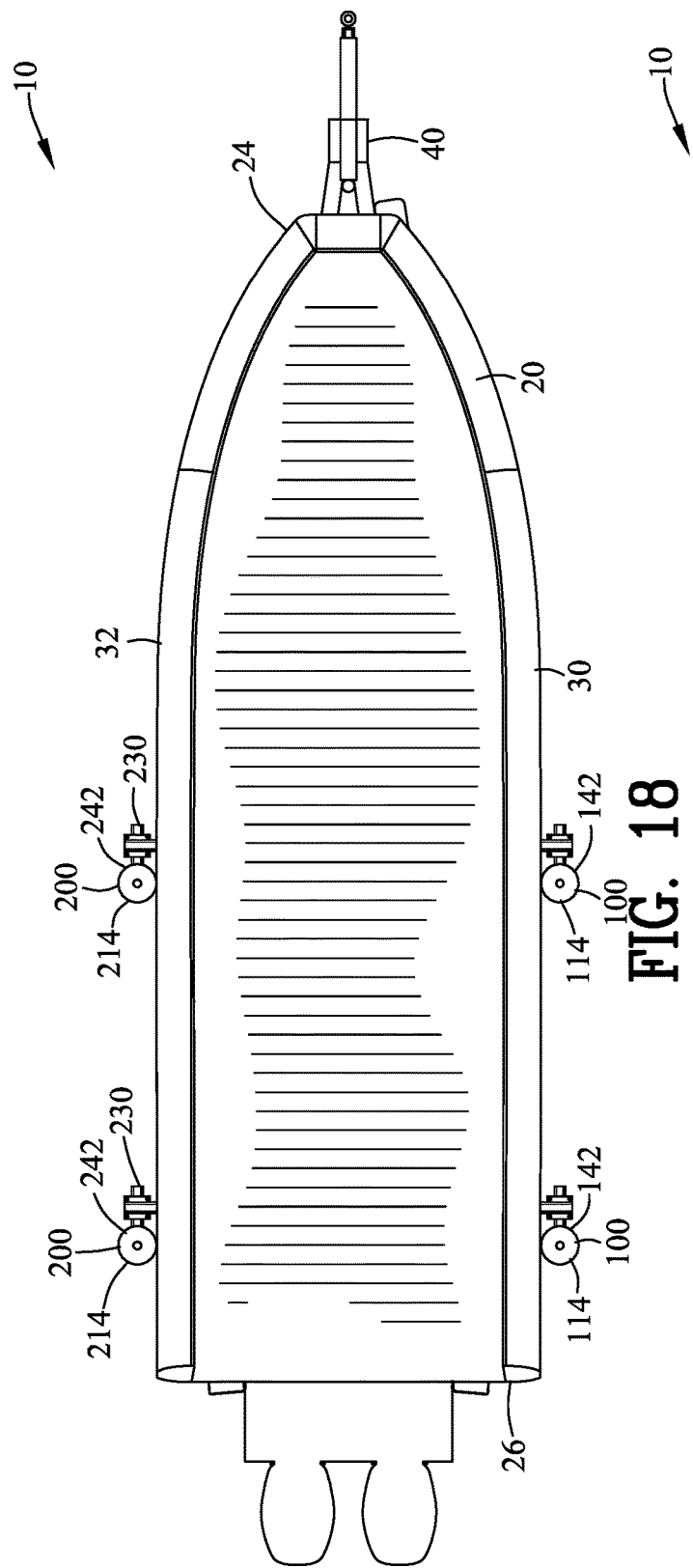
FIG. 18 is a view similar to FIG. 17 illustrating the vessel fully engaged with the trailer and illustrating the plurality of torsion guides on the left and the plurality of torsion guides on the right side of the trailer slightly compressing against the vessel.
Figure 19:
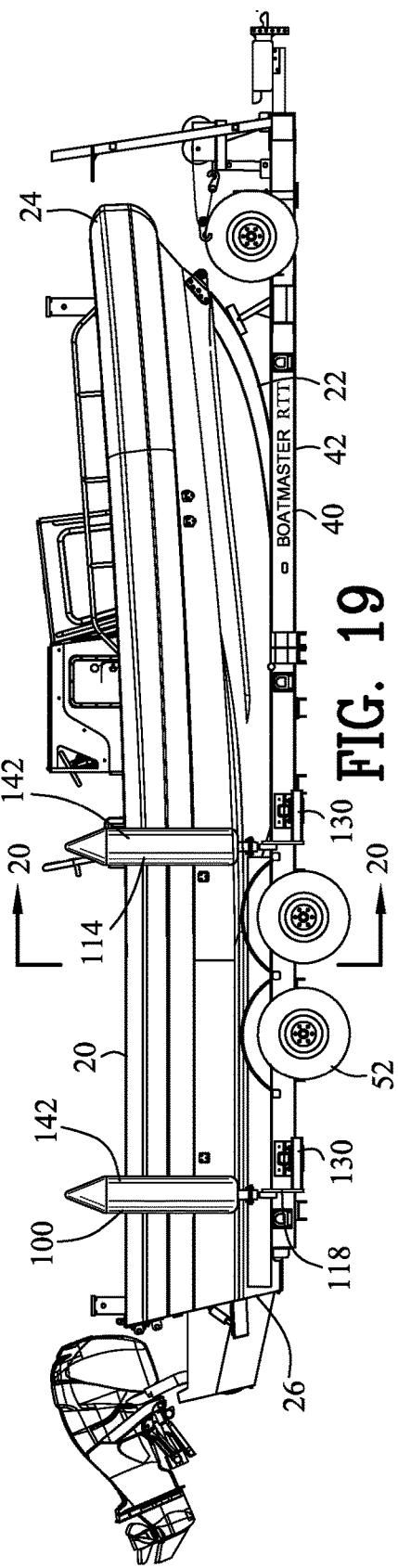
FIG. 19 is a front view of FIG. 18.
Figure 20:
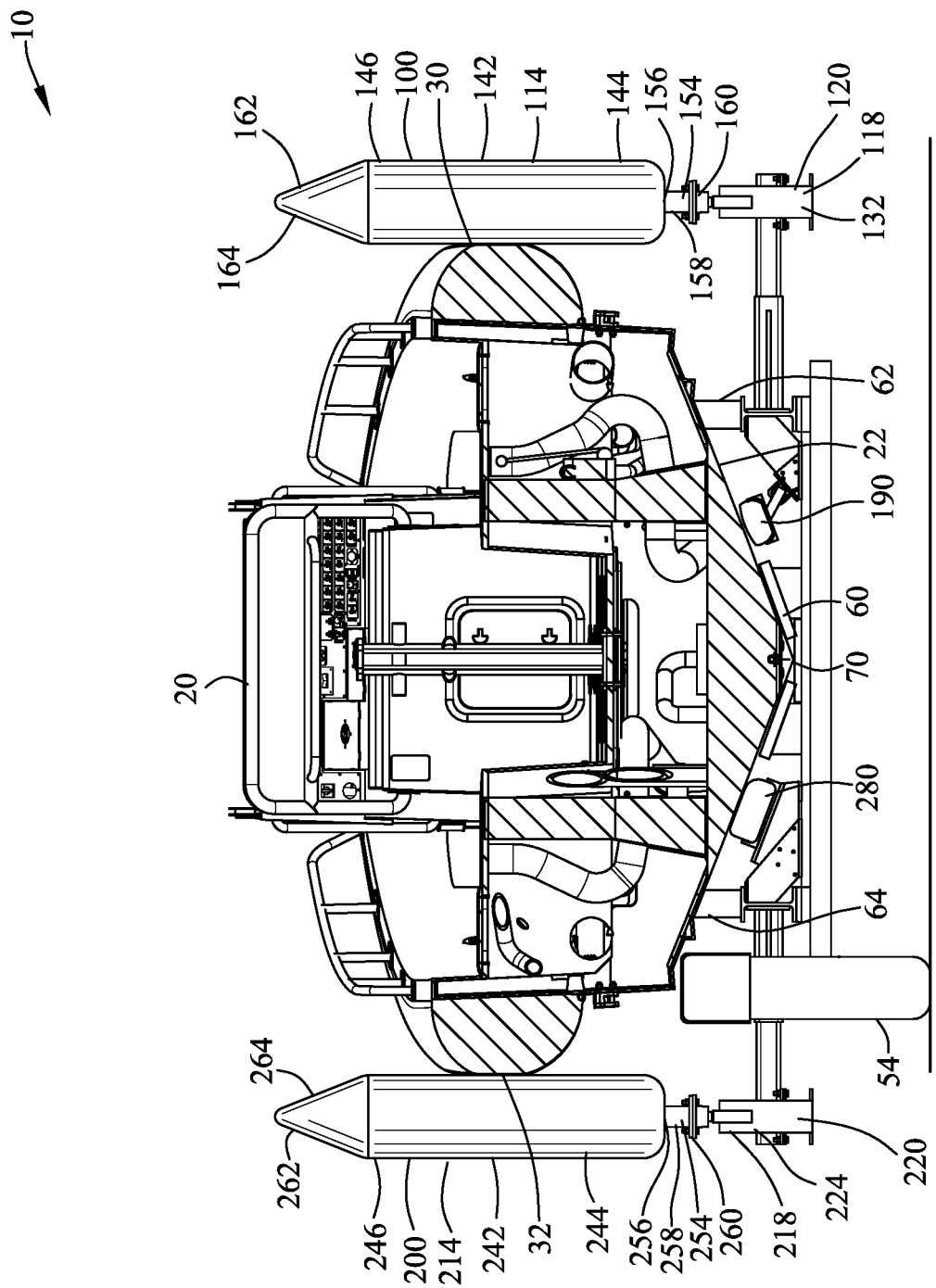
FIG. 20 is a sectional view along line 20-20 in FIG. 19.

As seen in FIGS. 11 and 13, the primary torsion guide 100 may include a primary body 104 coupled to the base 40. The primary body 104 defines a primary chamber 106. A primary finger 108 is positioned within the primary chamber 106 of the primary body 104. The primary body 104 and the primary finger 108 define a plurality of primary voids 110 between the primary body 104 and the primary finger 108. A plurality of deformable primary members 112 are positioned within the plurality of primary voids 110. A primary upright 114 is coupled to the primary finger 108. The primary upright 114 is displaced outwardly from the base center 70 upon the vessel 20 impacting with the primary upright 114.

Figure 25:
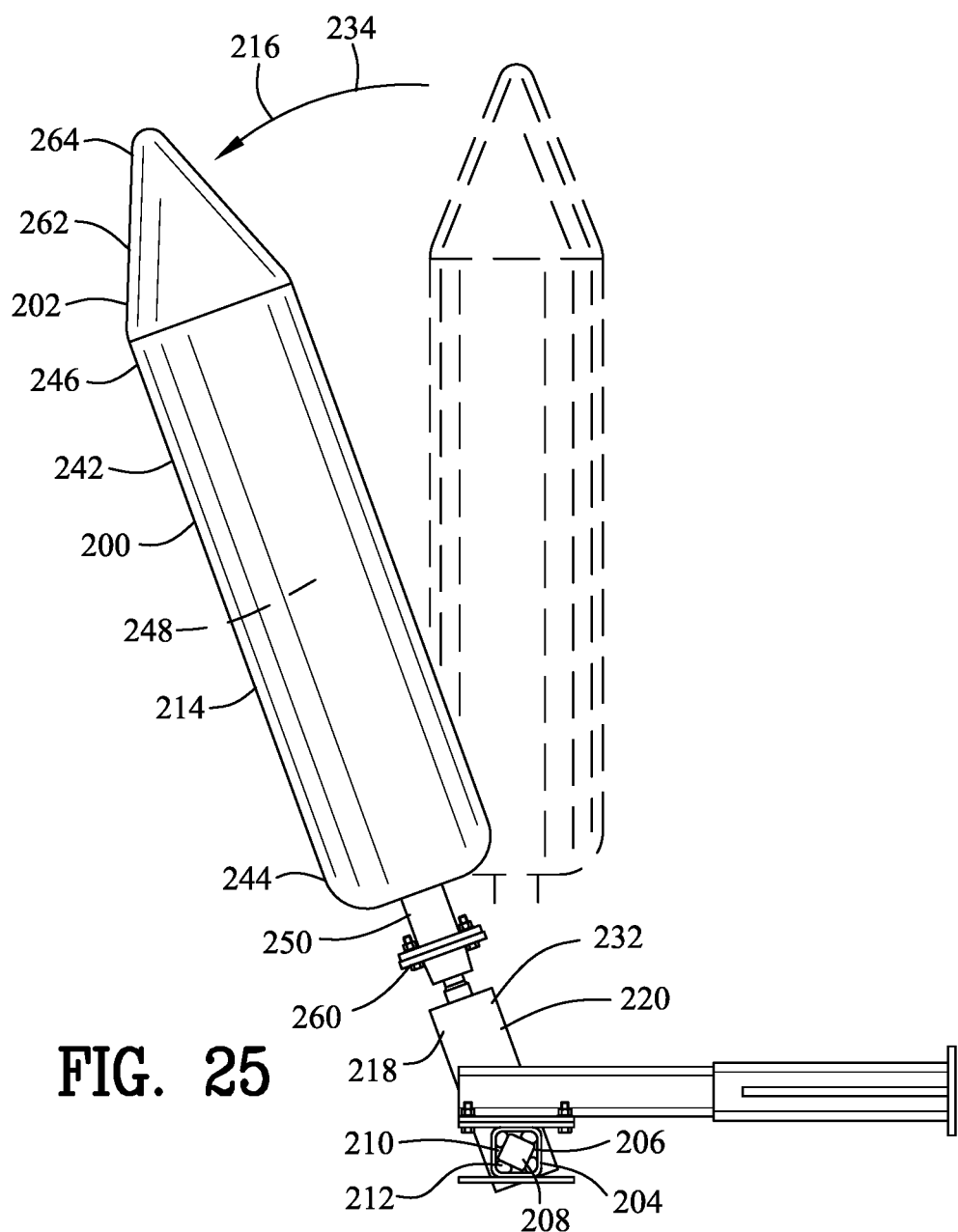
FIG. 25 is a right side view of FIG. 23 illustrating the torsion guide being outwardly displaced and rotationally displaced.
Figure 26:
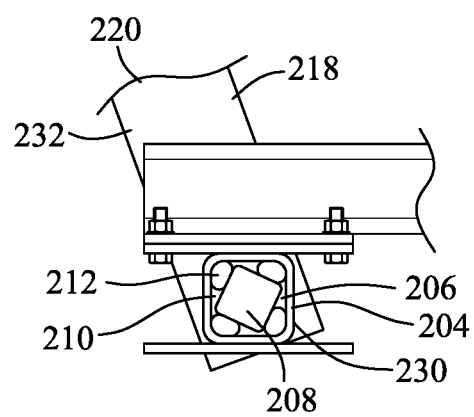
FIG. 26 is an enlarged portion of FIG. 25 illustrating the plurality of deformable members in a compressed state upon the torsion guide being outwardly displaced.

As seen in FIGS. 24 and 25, the primary progressive increasing counteracted force 102 is defined by a rotational displacement 116 of the primary finger 108 relative to the primary body 104 and results in the plurality of deformable primary members 112 being compressed within the plurality of primary voids 110 and between the primary body 104 and the primary finger 108. The primary body 104 and the primary finger 108 may include a square cross-section; however, the primary body 104 and the primary finger 108 may include an octagon, triangle or other geometric cross-sections.

The secondary torsion guide 200 includes a secondary body 204 coupled to the base 40. The secondary body 204 defines a secondary chamber 206. A secondary finger 208 is positioned within the secondary chamber 206 of the secondary body 204. The secondary body 204 and the secondary finger 208 define a plurality of secondary voids 210 between the secondary body 204 and the secondary finger 208. A plurality of deformable secondary members 212 are positioned within the plurality of secondary voids 210. A secondary upright 214 is coupled to the secondary finger 208. The secondary upright 214 is displaced outwardly from the base center 70 upon the vessel 20 impacting with the secondary upright 214.

The secondary progressive increasing counteracted force 202 is defined by a rotational displacement 216 of the secondary finger 208 relative to the secondary body 204 and results in the plurality of deformable secondary members 212 being compressed within the plurality of secondary voids 210 and between the secondary body 204 and the secondary finger 208. The secondary body 204 and the secondary finger 208 may include a square cross-section; however, the secondary body 204 and the secondary finger 208 may include an octagon, triangle or other geometric cross-sections.

The plurality of deformable primary members 112 and the plurality of deformable secondary members 212 are constructed of a rubber material such as latex. In order to install the plurality of deformable primary members 112 and the plurality of deformable secondary members 212 they may be placed in a refrigeration container for reducing their temperature and causing there outside diameter to decrease. Thereafter the plurality of deformable primary members 112 and the plurality of deformable secondary members 212 may be compressed within the plurality of primary voids 110 and the plurality of secondary voids to tend respectively. The force exerted by the primary progressive increasing counteracted force 102 and the secondary progressive increasing counteracted force 202 exerts back on the vessel 20 may be altered by selecting differing density of rubber material. For example, a more dense rubber material will provide an increased counteracted force 102 and 202. A less dense rubber material will provide a decreased counteracted force 102 and 202.

A primary arm 118 may be coupled between the primary finger 108 and the primary upright 114 for defining a primary lever arm 120 relative to the primary finger 108 and the primary upright 114. The primary lever arm 120 increases the rotational force applied to the primary finger 108 for permitting increased compression of the plurality of deformable primary members 112 and increasing the primary progressive increasing counteracted force 102.

Similarly, a secondary arm 218 may be coupled between the secondary finger 208 and the secondary upright 214 for defining a secondary lever arm 220 relative to the secondary finger 208 and the secondary upright 214. The secondary lever arm 220 increases the rotational force applied to the secondary finger 208 for permitting increased compression of the plurality of deformable secondary members 212 and increasing the secondary progressive increasing counteracted force 202.

As shown in FIGS. 1-13, the primary body 104 and the primary finger 108 may have a primary general vertical orientation 122. The primary arm 118 has a primary general horizontal orientation 124. The primary general vertical orientation 122 and the primary general horizontal orientation 124 displace the primary upright 114 in a primary general horizontal arcuate displacement 126 relative to the base 40.

Similarly, the secondary body 204 and the secondary finger 208 may have a secondary general vertical orientation 222. The secondary arm 218 has a secondary general horizontal orientation 224. The secondary general vertical orientation 222 and the secondary general horizontal orientation 224 displaces the secondary upright 214 in a secondary general horizontal arcuate displacement 226 relative to the base 40.

Alternatively, as shown in FIGS. 14-26 and 30-61 the primary body 104 and the primary finger 108 has a primary general horizontal orientation 130. The primary arm 118 has a primary general vertical orientation 132. The primary general horizontal orientation 130 and the primary general vertical orientation 132 displace the primary upright 114 in a primary general vertical arcuate displacement 134 relative to the base 40.

Similarly, the secondary body 204 and the secondary finger 208 may have a primary general horizontal orientation 230. The secondary arm 218 has a secondary general vertical orientation 232. The secondary general horizontal orientation 230 and the secondary general vertical orientation 232 displace the secondary upright 214 in a secondary general vertical arcuate displacement 234 relative to the base 40.

As shown in FIGS. 1-61 the vessel controlling device 10 may include a plurality of primary torsion guides 100 secured to the primary frame 46 and a plurality of secondary torsion guides 200 secured to the secondary frame 48 for increasing the primary progressive increasing counteracted force 102 and the secondary progressive increasing counteracted force 202 respectively. The plurality of primary torsion guides 100 secured to the primary frame 46 and the plurality of secondary torsion guides 200 secured to the secondary frame 48 further assist in aligning the vessel 20 by increasing the contact area between the vessel controlling device 10 and the vessel 24 aligning the vessel 20 with the base 40.

Figure 27:
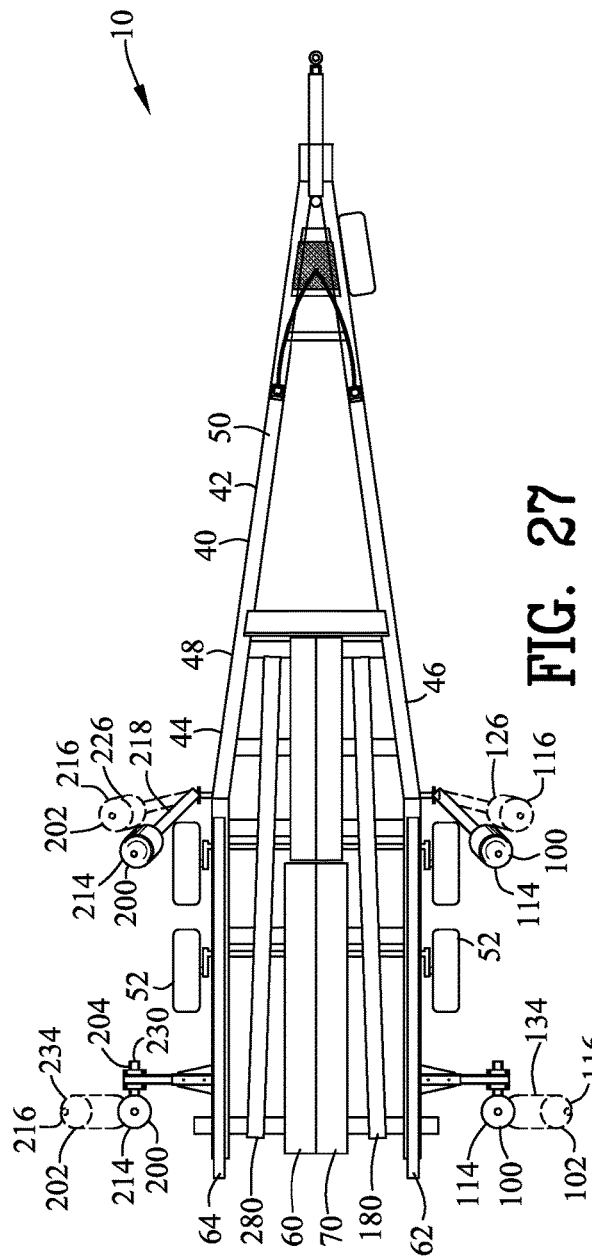
FIG. 27 is a top view of a third embodiment of a vessel controlling device of the present invention.
Figure 28:
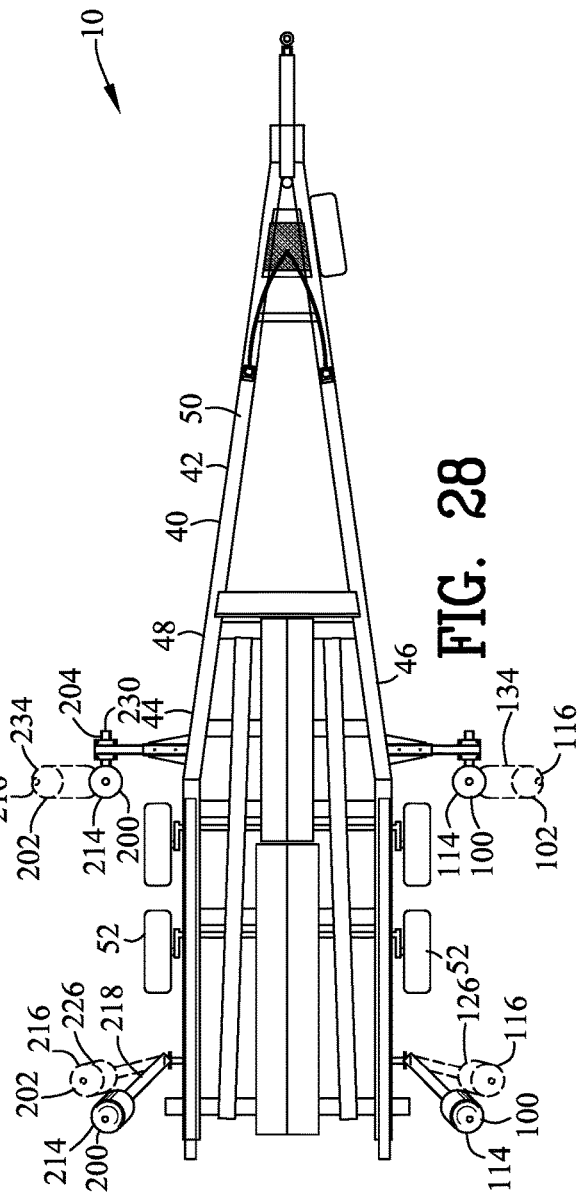
FIG. 28 is a top view of a fourth embodiment of a vessel controlling device of the present invention.
Figure 29:
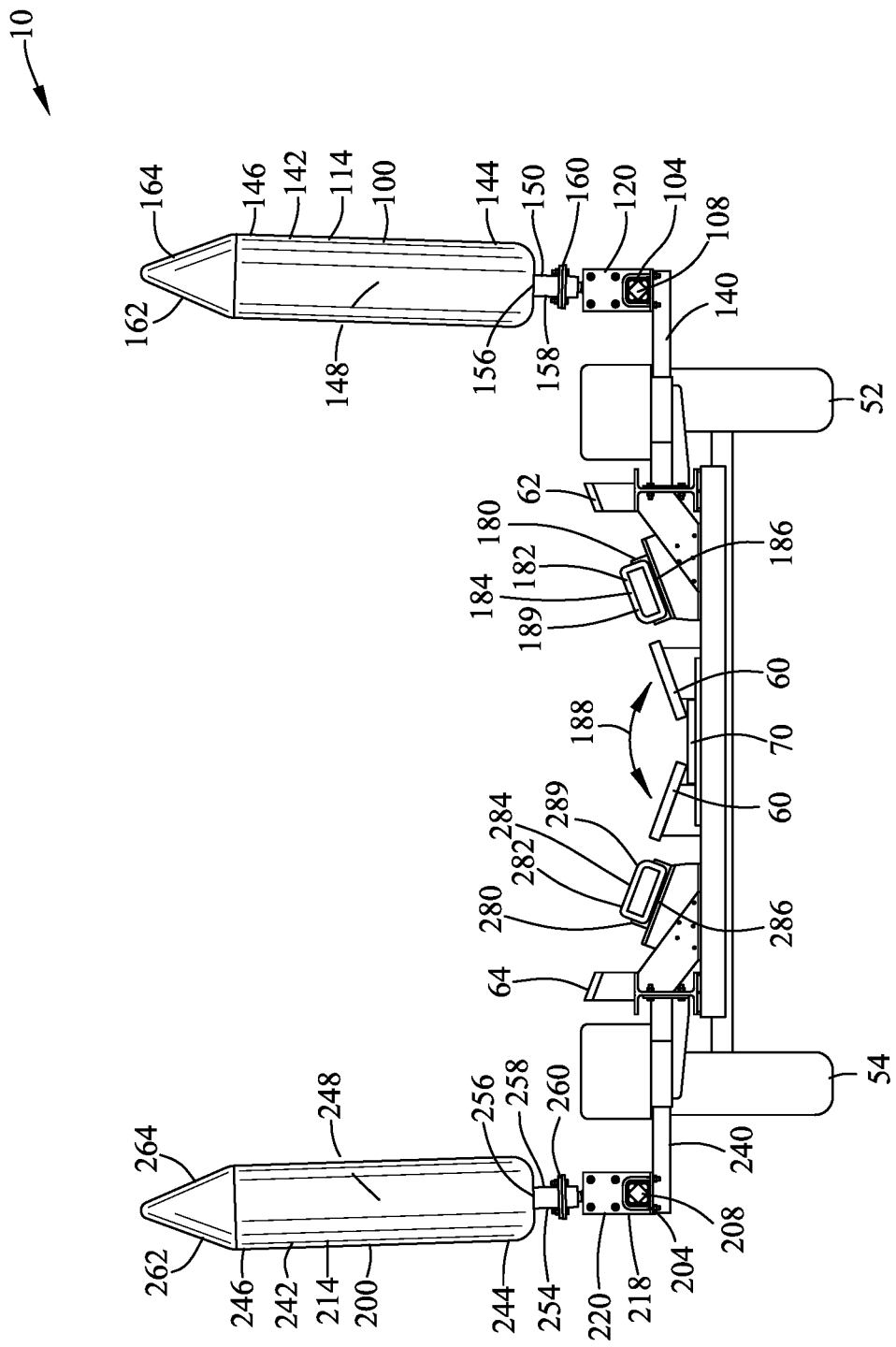
FIG. 29 is a rear view of the trailer illustrating a fifth embodiment of a vessel controlling device of the present invention.
Figure 30:
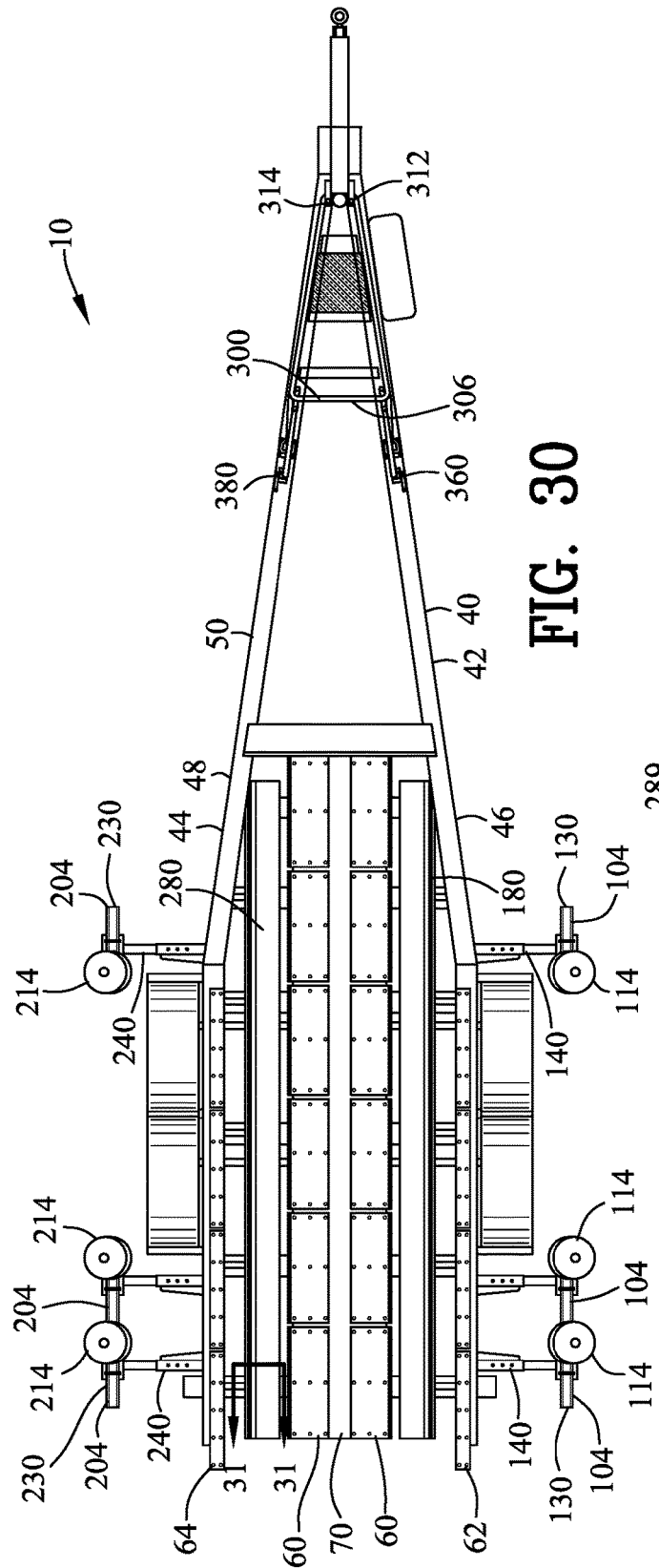
FIG. 30 is a top view of FIG. 29.
Figure 31:
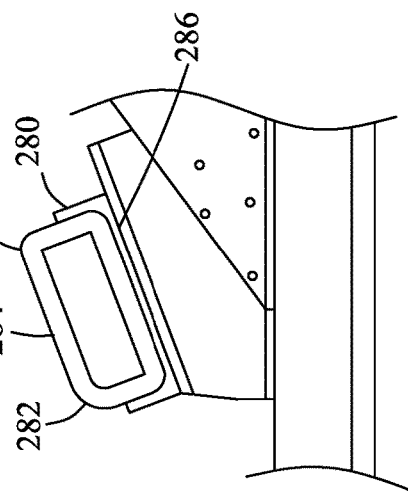
FIG. 31 is a sectional view along line 31-31 in FIG. 30.
Figure 32:
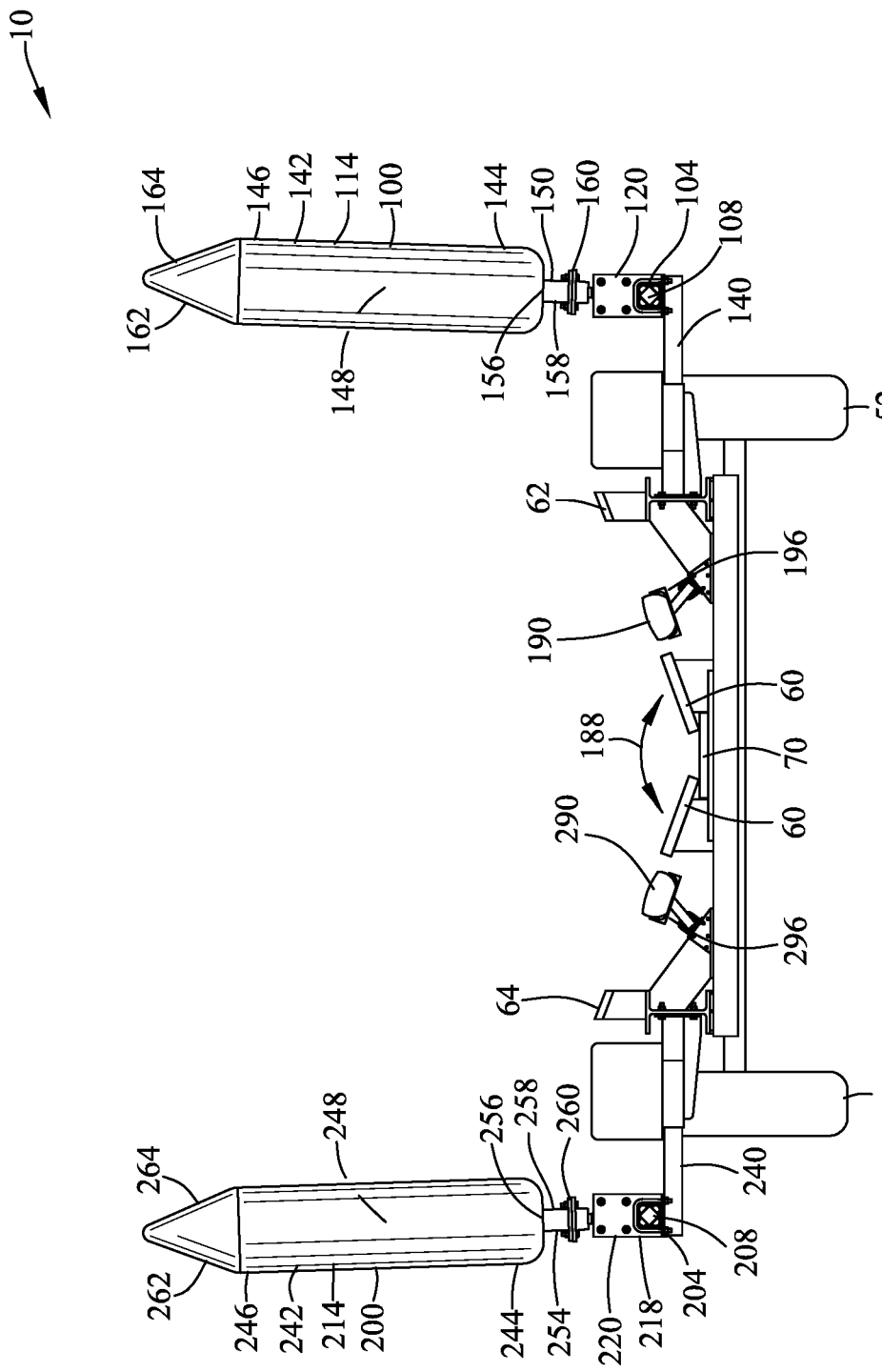
FIG. 32 is a rear view of the trailer illustrating a sixth embodiment of a vessel controlling device of the present invention.
Figure 33:
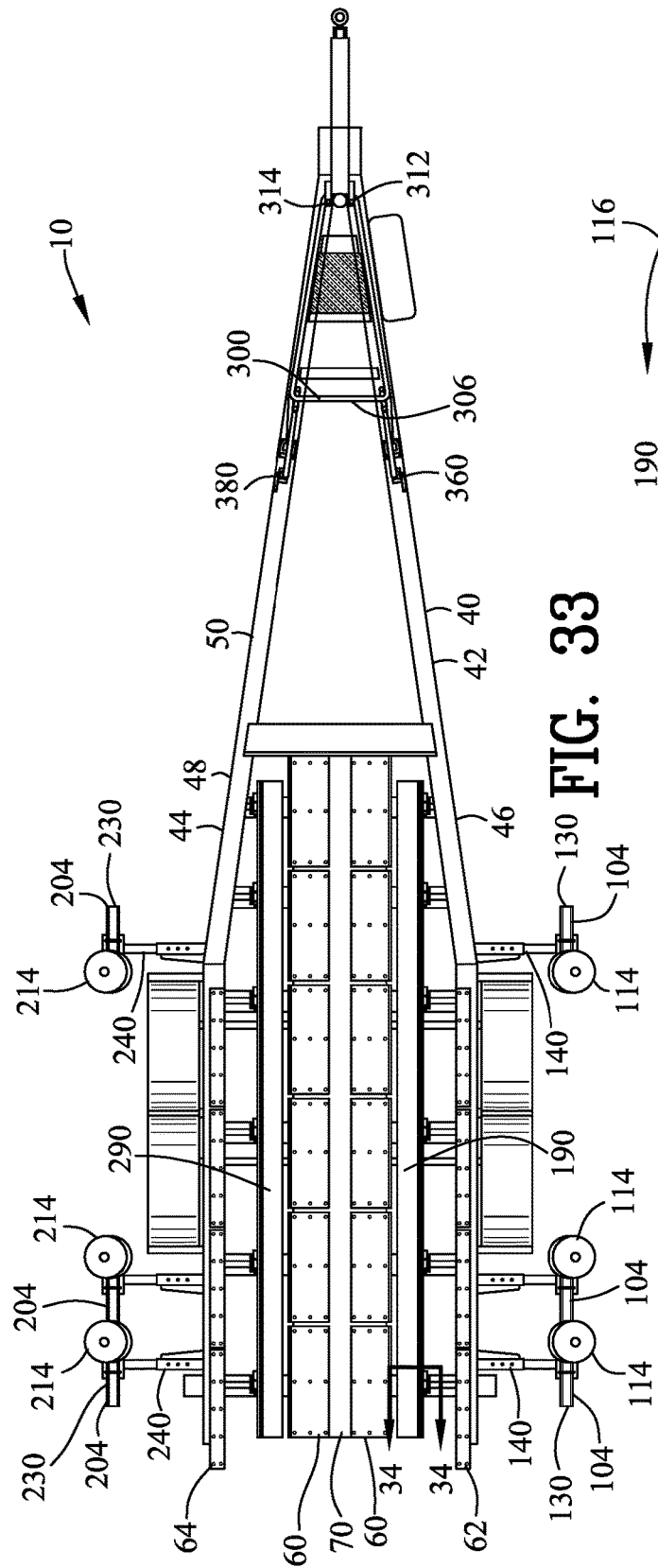
FIG. 33 is a top view of FIG. 32.
Figure 35:
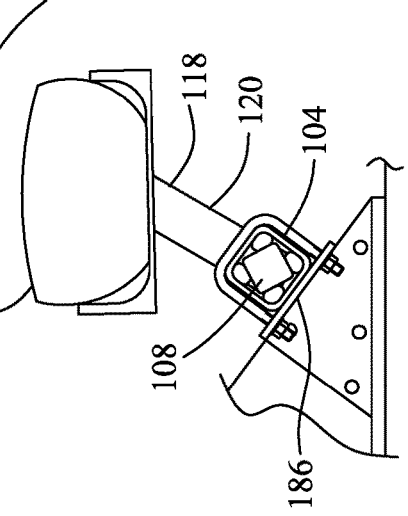
FIG. 35 is a view similar to FIG. 34 illustrating a torsion guide on the right side of the trailer being outwardly displaced in a vertical arcuate path after impact with a vessel and the plurality of deformable members in a compressed state.
Figure 34:
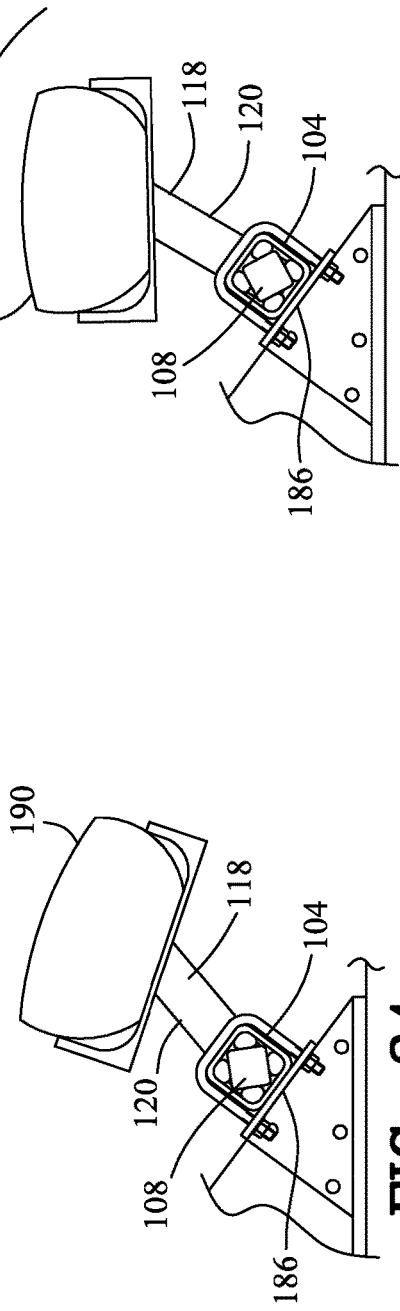
FIG. 34 is a sectional view along line 34-34 in FIG. 33 illustrating a plurality of deformable members in a non-compressed state.
Figure 36:
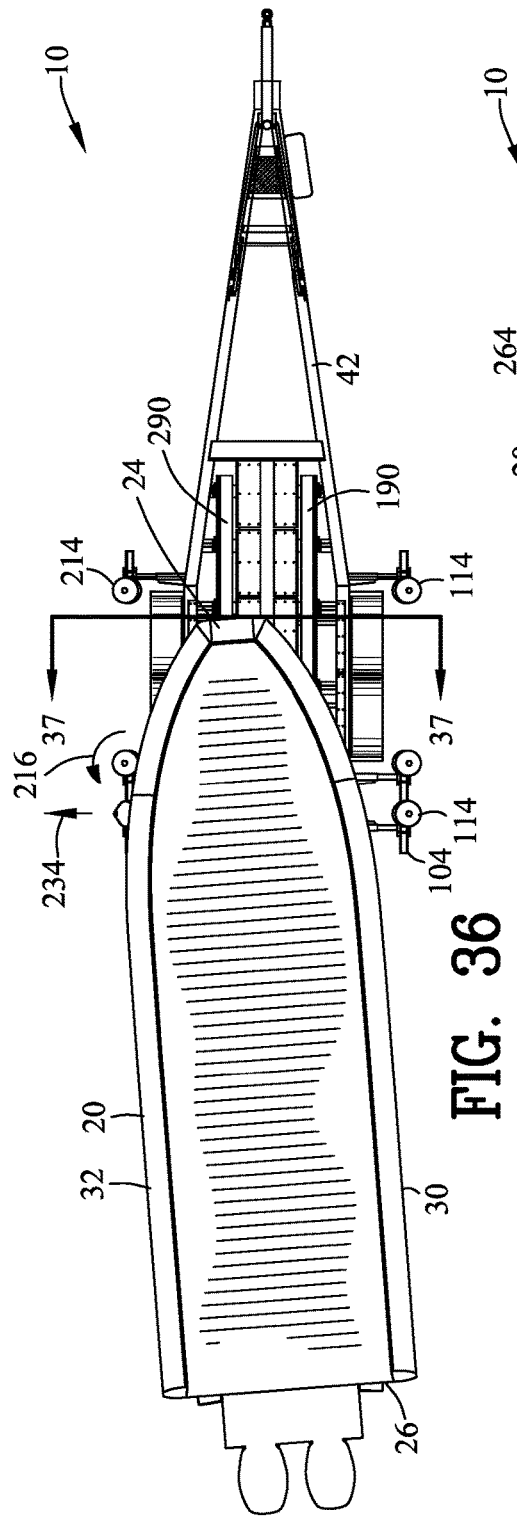
FIG. 36 is a view similar to FIG. 31 illustrating the vessel having an angular configuration relative to the trailer wherein the vessel is impacting with a plurality of upper torsion guides on the left side of the trailer and the plurality of upper torsion guides being outwardly displaced in a vertical arcuate path and being rotationally displaced.

As shown in FIGS. 27 and 28 a combination of the primary general vertical orientation 122 of the primary torsion guide 100 and the primary general horizontal orientation 130 of the primary torsion guide 100 may be utilized on the primary frame 46. Similarly, a combination of the secondary general vertical orientation 222 of the secondary torsion guide 200 and the secondary general horizontal orientation 230 of the secondary torsion guide 200 may be utilized on the secondary frame 48.

Figure 49:
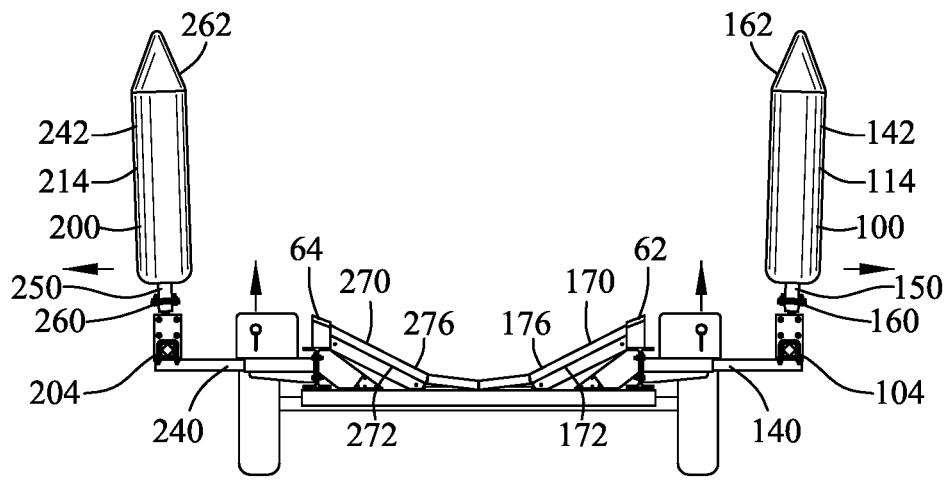
FIG. 49 is a view similar to FIG. 39 illustrating the upper torsion guides being laterally adjustable relative to the trailer by an adjustable linkage.

As best shown in FIGS. 49, a primary adjustable linkage 140 may couple the primary torsion guide 100 with the base 40. The primary adjustable linkage 140 altering the distance between the primary torsion guide 100 and the base center 70. Similarly, a secondary adjustable linkage 240 may couple the secondary torsion guide 200 with the base 40. The secondary adjustable linkage 240 altering the distance between the secondary torsion guide 200 and the base center 70. The primary adjustable linkage 140 and the secondary adjustable linkage 240 alters the distance between the primary torsion guide 100 and the secondary torsion guide 200 for accommodating different size vessels 20. Furthermore, the primary adjustable linkage 140 and the secondary adjustable linkage 240 may be utilized for adjusting the compressive force that the primary torsion guide 100 and the secondary torsion guide 200 applied to the vessel 20 when fully engaged with the base 40. The primary adjustable linkage 140 and the secondary adjustable linkage 240 may include tubular members having a square cross-section. The pair of tubular members would consist of different dimensional cross-sections for permitting slidable engagement between the tubular members. The pair of tubular members may include through bores where bullpens bolts or screws may traverse for locking the primary adjustable linkage 140 and the secondary adjustable linkage 240 from further telescoping displacement.

The primary torsion guide 100 may further include a primary deformable collar 142. The primary deformable collar 142 is coupled to the primary upright 114 for cushioning the engagement between the primary upright 114 and the vessel 20. Similarly, the secondary torsion guide 200 may further include a secondary deformable collar 242. The secondary deformable collar 242 is coupled to the secondary upright 214 for cushioning the engagement between the secondary upright 214 and the vessel 20. The primary deformable collar 142 and the secondary deformable collar 242 may consist of a cylindrical body having an inner core and an outer cover layer. The inner core may consist of an expanded polyethylene (EPE) with a TPU Aliphatic PU. The outer cover layer may consist of a polyurethane material.

The primary upright 114 may include a primary elongated rod 150. The primary deformable collar 142 has a lower end 144 and an upper end 146. A primary bore 148 is within the primary deformable collar 142 and extends from the lower end 144 of the primary deformable collar 142. As best shown in FIG. 50, the primary elongated rod 150 slidably engages within the primary bore 148 for defining a primary elevational linkage 152 and adjusts the elevation of the primary deformable collar 142 relative to the base 40.

Similarly, the secondary upright 214 may includes a secondary elongated rod 250. The secondary deformable collar 242 having a lower end 244 and an upper end 246. A secondary bore 248 is within the secondary deformable collar 242 and extends from the lower end 244 of the secondary deformable collar 242. The secondary elongated rod 250 slidably engages within the secondary bore 248 for defining a secondary elevational linkage 252 and adjusts the elevation of the secondary deformable collar 242 relative to the base 40.

The primary elevational linkage 152 and the secondary elevational linkage 252 may be utilized wherein the base 40 is partially submerged or entirely submerged underneath the surface 14 of a body of water 12 (FIG. 50). The primary elevational linkage 152 and the secondary elevational linkage 252 permit the increase in the functional height of the primary torsion guide 100 and the secondary torsion guide 200 respectively. Preferably, the primary deformable collar 142 and the secondary deformable collar 242 are buoyant when placed in a body of water.

The primary elevational linkage 152 permits an ascending slidable displacement of the primary deformable collar 142 relative to the primary upright 114 when the primary deformable collar 142 is inserted into a body of water. Furthermore, the primary elevational linkage 152 permits a descending slidable engagement of the primary deformable collar 142 relative to the primary upright 114 when the primary deformable collar 142 is removed from the body of water.

The secondary elevational linkage 252 permits an ascending slidable displacement of the secondary deformable collar 242 relative to the secondary upright 214 when the secondary deformable collar 242 is inserted into the body of water. Furthermore, the secondary elevational linkage 252 permits a descending slidable engagement of the secondary deformable collar 242 relative to the secondary upright 214 when the secondary deformable collar 242 is removed from the body of water.

The primary elevational linkage 152 and the secondary elevational linkage 252 permit the removal of the primary deformable collar 142 and the secondary deformable collar 242 from the primary upright 114 and the secondary upright 214 respectively. The removal of the primary deformable collar 142 and the secondary deformable collar 242 may be beneficial for avoiding a wide load condition when transporting the base 40 over the ground.

Figure 51:
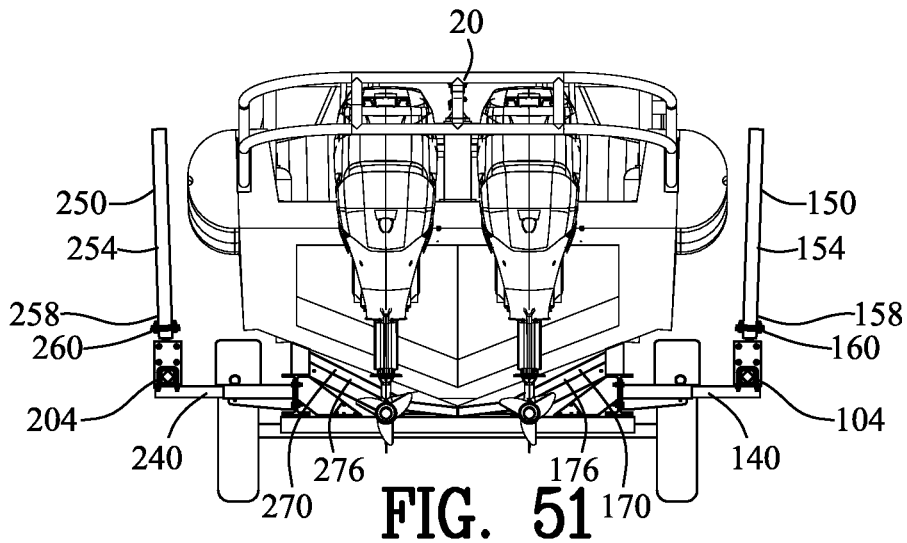
FIG. 51 is a view similar to FIG. 48 wherein the deformable collars are removed from the upper torsion guides.

More specifically, the primary upright 114 may include a primary elongated cylindrical rod 154 (FIG. 51). A primary cylindrical bore 156 (FIG. 39) is within the primary deformable collar 142 and extends from the lower end 144 of the primary deformable collar 142. The primary elongated cylindrical rod 154 rotates within the primary cylindrical bore 156 for defining a primary rotating linkage 158 and permits a rotational displacement of the primary deformable collar 142 during a lateral engagement between the primary deformable collar 142 and the vessel 20 and promotes the vessel 20 to travel relative to the base 40 during engagement with the primary torsion guide 100.

Figure 39:
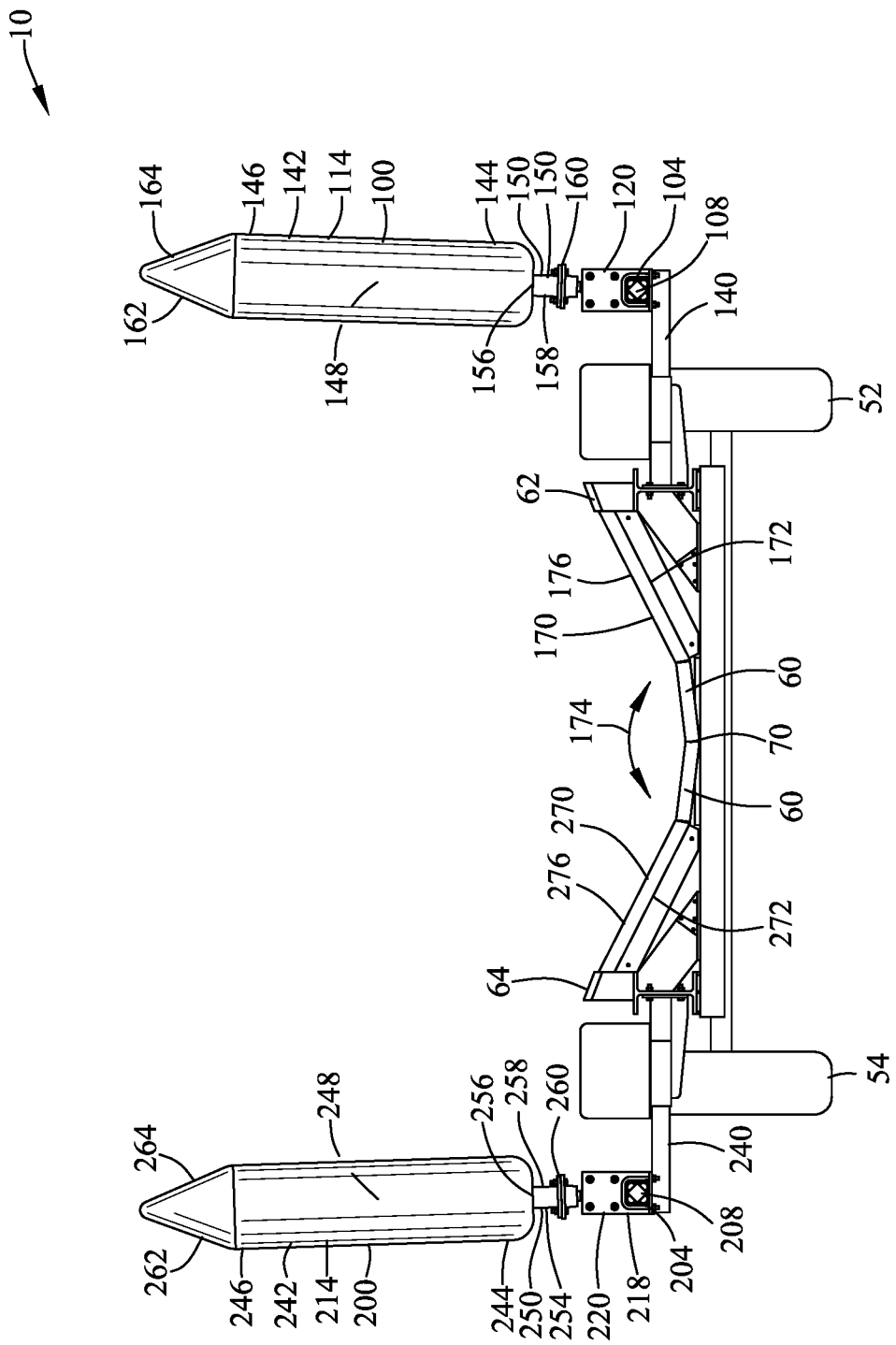
FIG. 39 is a rear view of the trailer illustrating a seventh embodiment of a vessel controlling device of the present invention.
Figure 40:
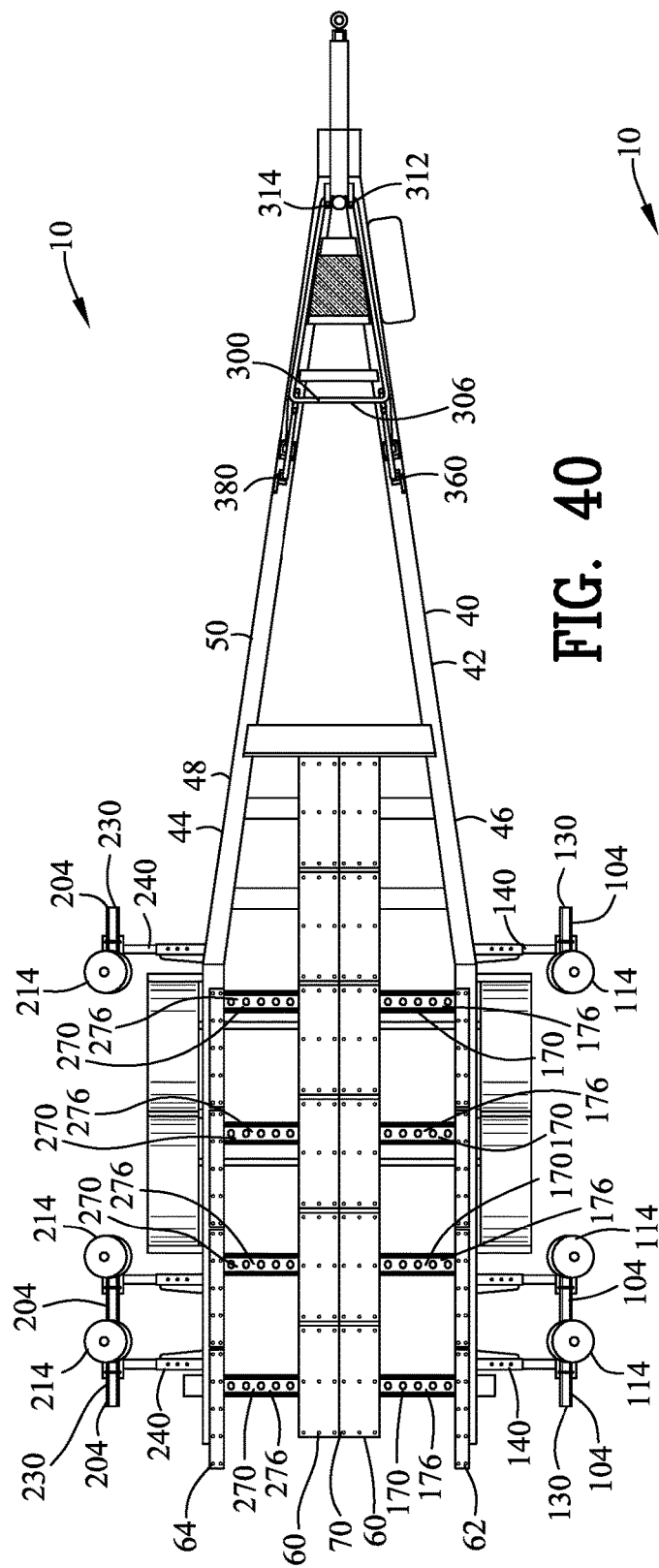
FIG. 40 is a top view of FIG. 39.
Figure 41:
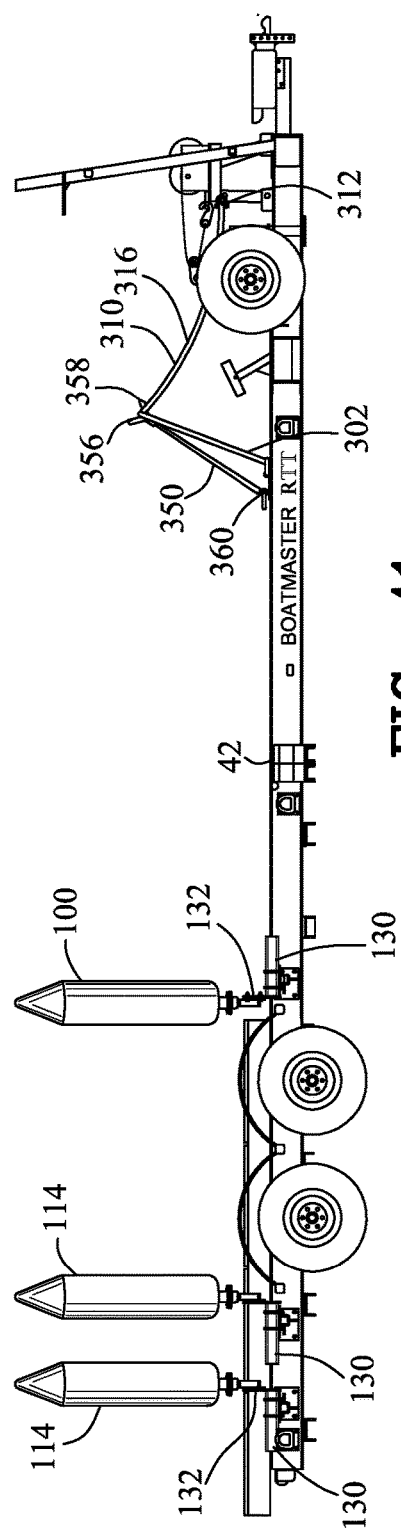
FIG. 41 is a right side view of FIG. 40.

Similarly, the secondary upright 214 may include a secondary elongated cylindrical rod 254 (FIG. 39). A secondary cylindrical bore 256 is within the secondary deformable collar 242 and extends from the lower end 244 of the secondary deformable collar 242. The secondary elongated cylindrical rod 250 rotates within the secondary cylindrical bore 256 for defining a secondary rotating linkage 258 and permits a rotational displacement of the secondary deformable collar 242 during a lateral engagement between the secondary deformable collar 242 and the vessel 20 and promoting the vessel 20 to travel relative to the base 40 during engagement with the secondary torsion guide 200.

The primary torsion guide 100 may further include a primary hub 160 coupled between the primary finger 108 and the primary upright 114 for permitting a rotational displacement of the primary upright 114 during a lateral engagement between the primary upright 114 and the vessel 20 and promoting the vessel 20 to travel relative to the base 40 during engagement with the primary torsion guide 100. Similarly, a secondary hub 260 may be coupled between the secondary finger 208 and the secondary upright 214 for permitting a rotational displacement of the secondary upright 214 during a lateral engagement between the secondary upright 214 and the vessel 20 and promoting the vessel 20 to travel relative to the base 40 during engagement with thesecondary torsion guide 200.

The primary deformable collar 142 may further include a primary deformable conical cap 162 coupled to the upper end 146 of the primary deformable collar 142 for increasing the contact area between the primary deformable collar 142 and the vessel 20 and cushioning the engagement between the primary upright 114 and the vessel 20. The primary deformable conical cap 162 defines a primary tapered contact area 164 between the primary deformable collar 142 and the vessel 20. The primary tapered contact area 164 increases the contact area between the primary upright 114 and the vessel 20 for promoting rotational displacement of the primary deformable collar 142 during a lateral engagement between the primary deformable collar 142 and the vessel 20 and promotes the vessel 20 to travel relative to the base 40 during engagement with the primary torsion guide 100. Furthermore, the primary tapered contact area 164 increases the contact area between the primary deformable collar 142 and the vessel 20 for cushioning the engagement between the primary upright 114 and the vessel 20.

Similarly, a secondary deformable conical cap 262 may be coupled to the upper end 246 of the secondary deformable collar 242 for increasing the contact area between the secondary deformable collar 242 and the vessel 20 and cushioning the engagement between the secondary upright 214 and the vessel 20. The secondary deformable conical cap 262 defines a secondary tapered contact area 264 between the secondary deformable collar 242 and the vessel 20. The secondary tapered contact area 264 increasing the contact area between the secondary upright 214 and the vessel 20 for promoting rotational displacement of the secondary deformable collar 242 during a lateral engagement between the secondary deformable collar 242 and the vessel 20 and promotes the vessel 20 to travel relative to the base 40 during engagement with the secondary torsion guide 200. Furthermore, the secondary tapered contact area 264 increases the contact area between the secondary deformable collar 242 and the vessel 20 for cushioning the engagement between the secondary upright 214 and the vessel 20.

As shown in FIGS. 39-61 the vessel controlling device 10 may include a primary guide body 170 coupled to the base 40. A secondary guide body 270 is couple to the base 40. The primary guide body 170 and the secondary guide body 270 defining the base center 70 on the base 40 and between the primary guide body 170 and the secondary guide body 270. The primary guide body 170 defines a primary angle 172 relative to the base 40. The secondary guide body 270 defines a secondary angle 272 relative to the base 40. The primary angle 172 and the secondary angle 272 define an obtuse angle 174 between the primary guide body 170 and the secondary guide body 270.

The primary angle 170 of the primary guide body 170 redirects the vessel 20 towards the base center 70 upon the vessel 20 impacting with the primary guide body 170. The primary guide body 170 permits a primary low friction coefficient 176 with the vessel 20 during a lateral engagement between the primary guide body 170 and the vessel 20 and promotes the vessel 20 to travel relative to the base 40 during engagement with the primary guide body 170.

Similarly, the secondary angle 272 of the secondary guide body 270 redirects the vessel 20 towards the base center 70 upon the vessel 20 impacting with the secondary guide body 270. The secondary guide body 270 permits a secondary low friction coefficient 276 with the vessel 20 during a lateral engagement between the secondary guide body 270 and the vessel 20 and promotes the vessel 20 to travel relative to the base 40 during engagement with the secondary guide body 270. The primary guide body 170 and the secondary guide body 270 may be constructed from a TDI polyether.

As shown in FIGS. 7,27-31, the vessel controlling device 10 may include a primary elongated channel 180 coupled to the base 40. The primary elongated channel 180 may include an elongated C-shape channel. A primary elongated deformable band 182 is coupled to the primary elongated channel 180 for defining a primary elongated deflection body 184. The primary elongated deformable band 182 may be coupled to the primary elongated channel 180 by bolts, screws, adhesive or other coupling devices. A secondary elongated channel 280 is coupled to the base 40. The secondary elongated channel 280 may include an elongated C-shape channel. A secondary elongated deformable band 282 is coupled to the secondary elongated channel 282 for defining a secondary elongated deflection body 284. The secondary elongated deformable band 282 may be coupled to the secondary elongated channel 280 by bolts, screws, adhesive or other coupling devices.

The primary elongated deflection body 184 and the secondary elongated deflection body 284 defining the base center 70 on the base 40 and between the primary elongated deflection body 184 and the secondary elongated deflection body 284.

The primary elongated deflection body 184 defines a primary angle 186 relative to the base 40. The secondary elongated deflection body 284 defines a secondary angle 286 relative to the base 40. The primary angle 186 and the secondary angle 286 define an obtuse angle 188 between the primary elongated deflection body 184 and the secondary elongated deflection body 284.

The primary angle 186 of the primary elongated deflection body 184 redirects the vessel 20 towards the base center 70 upon the vessel 20 impacting with the primary elongated deflection body 184. The primary elongated deflection body 184 defonns upon the vessel 20 impacting with the primary elongated deflection body 184 and the primary elongated deflection body 184 provides a primary counteracted force 190 (FIG. 32) for pushing the vessel 20 toward the base center 70.

Similarly, the secondary angle 286 of the secondary elongated deflection body 284 redirects the vessel 20 towards the base center 70 upon the vessel 20 impacting with the secondary elongated deflection body 284. The secondary elongated deflection body 284 deforms upon the vessel 20 impacting with the secondary elongated deflection body 284 and the secondary elongated deflection body 284 provides a secondary counteracted force 290 (FIG. 32) for pushing the vessel 20 toward the base center 70. The primary elongated deformable band 182 and the secondary primary elongated deformable band 282 may be constructed from a rubber or latex.

Figure 37:
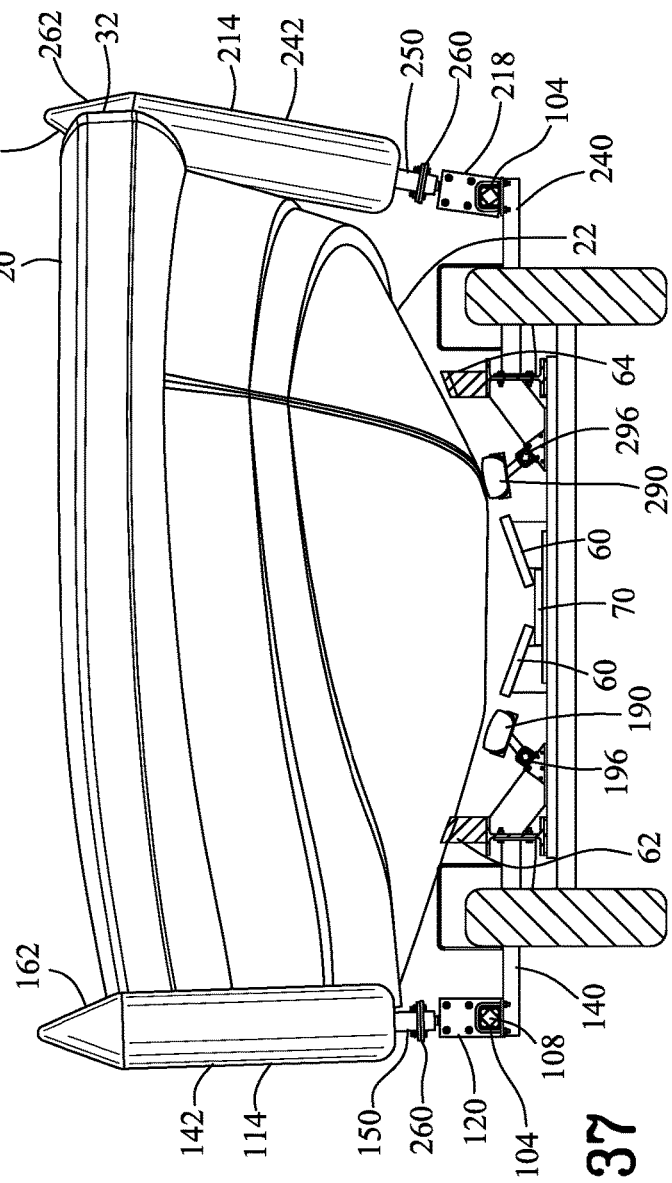
FIG. 37 is a sectional view along line 37-37 in FIG. 36 illustrating the vessel impacting with a lower torsion guide on the left side of the trailer and the lower torsion guide being outwardly displaced in a vertical arcuate path.
Figure 38:
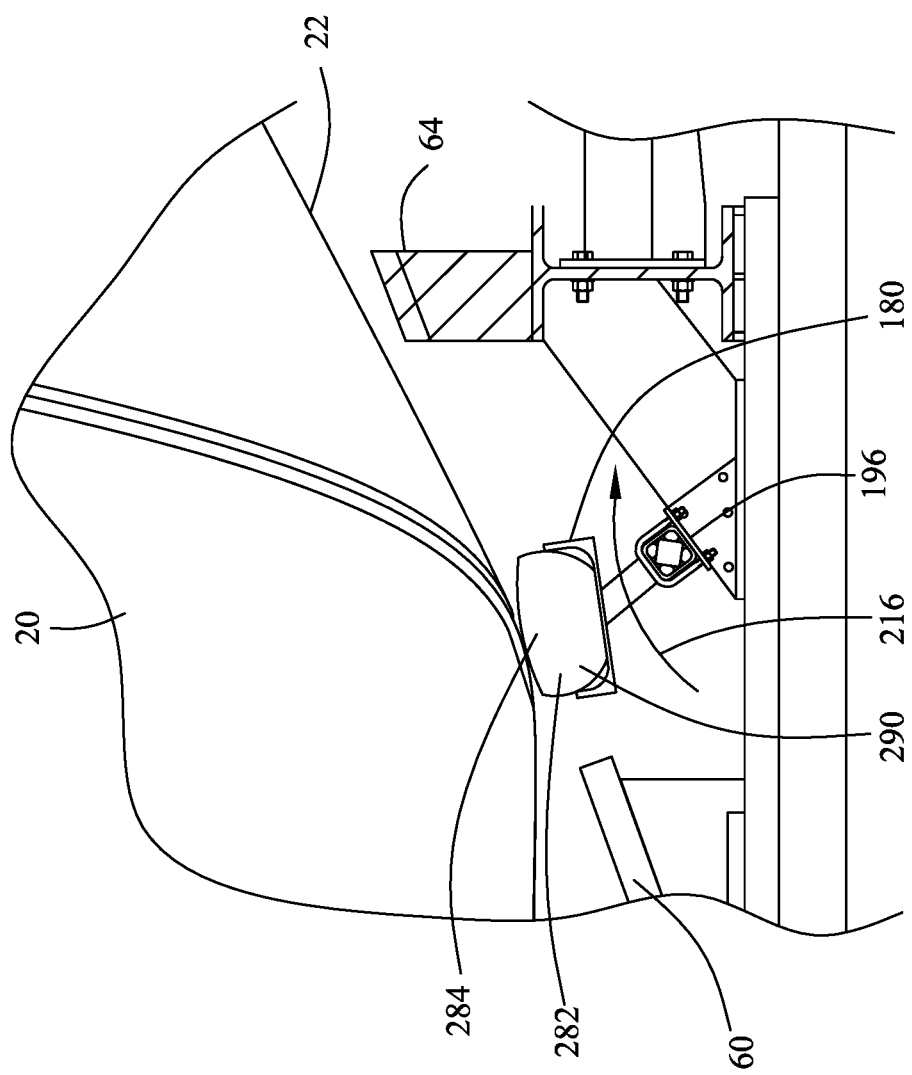
FIG. 38 is an enlarged portion of FIG. 37 illustrating the lower torsion guide being outwardly displaced in a vertical arcuate path after impact with a vessel and the plurality of deformable members in a compressed state.

As shown in FIGS. 37 and 38, the primary elongated deflection body 184 and the secondary elongated deflection body 284 as shown in FIGS. 7, 27-31 may be combined with the primary portion guide 100 and the secondary torsion guide 200 for defining a compound deformable and counteracted force device.

As best shown in FIGS. 54-61, the vessel controlling device 10 may include a forward retainer cord 300 extending from a primary end 302 (FIG. 59) to a secondary end 304. The primary end 302 and the secondary end 304 of the forward retainer cord 300 are coupled to the base 40 for defining a contact cord region 306 elevated above the base 40.

Figure 52:
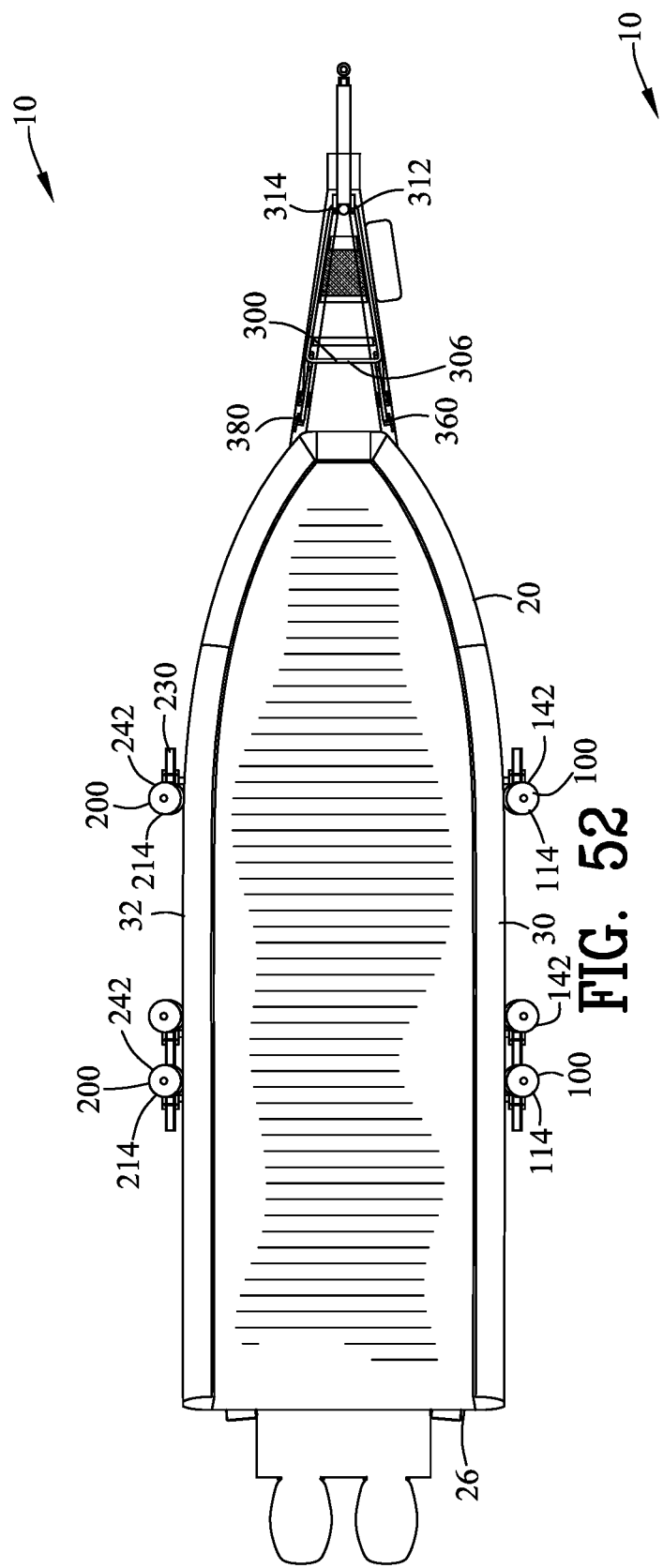
FIG. 52 is a view similar to FIG. 44 illustrating the upper torsion guides aligning the vessel relative to the trailer and the vessel approaching the cord vessel controlling device.
Figure 53:
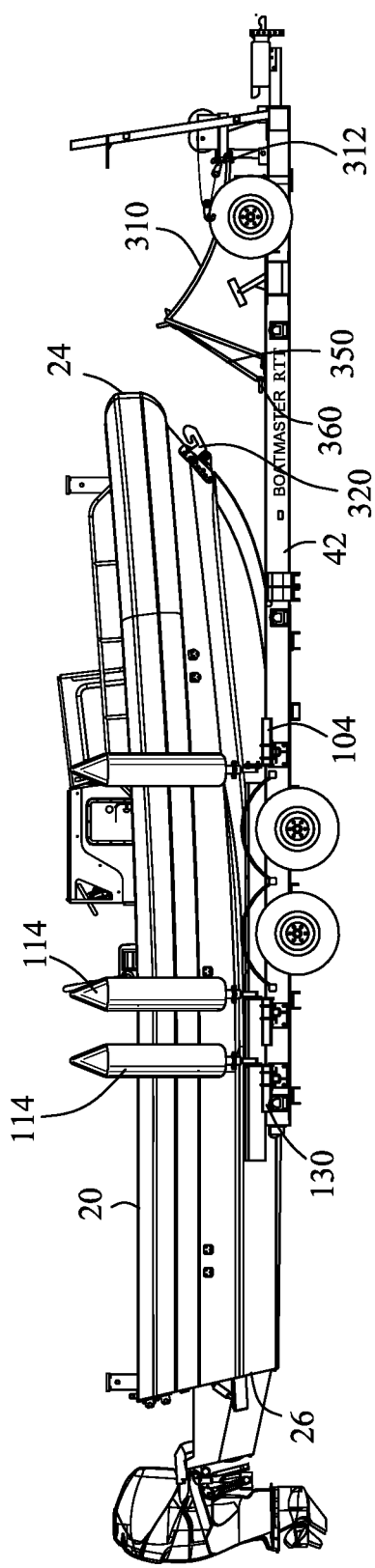
FIG. 53 is a front view of FIG. 52.
Figure 54:
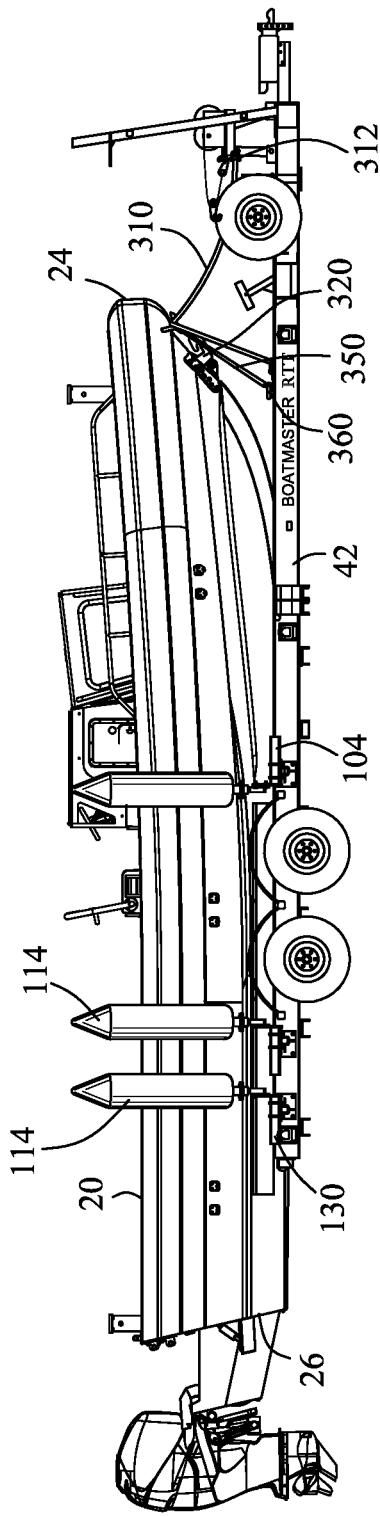
FIG. 54 is a view similar to FIG. 53 illustrating the vessel further displaced along the trailer and preparing to make contact with the cord vessel controlling device.
Figure 55:
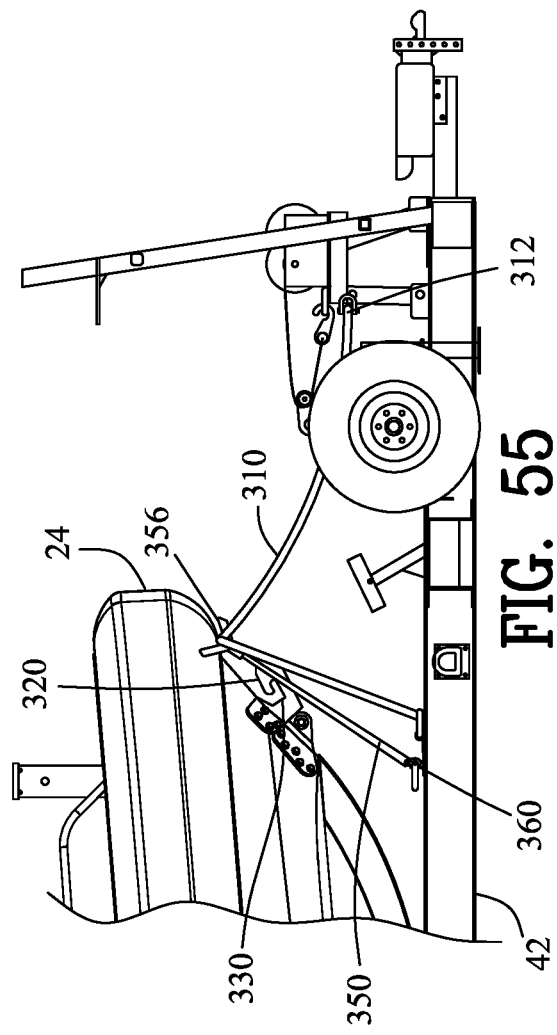
FIG. 55 is an enlarged portion of FIG. 54 illustrating a primary stanchion and a secondary stanchion supporting a forward retainer cord above the trailer.
Figure 56:
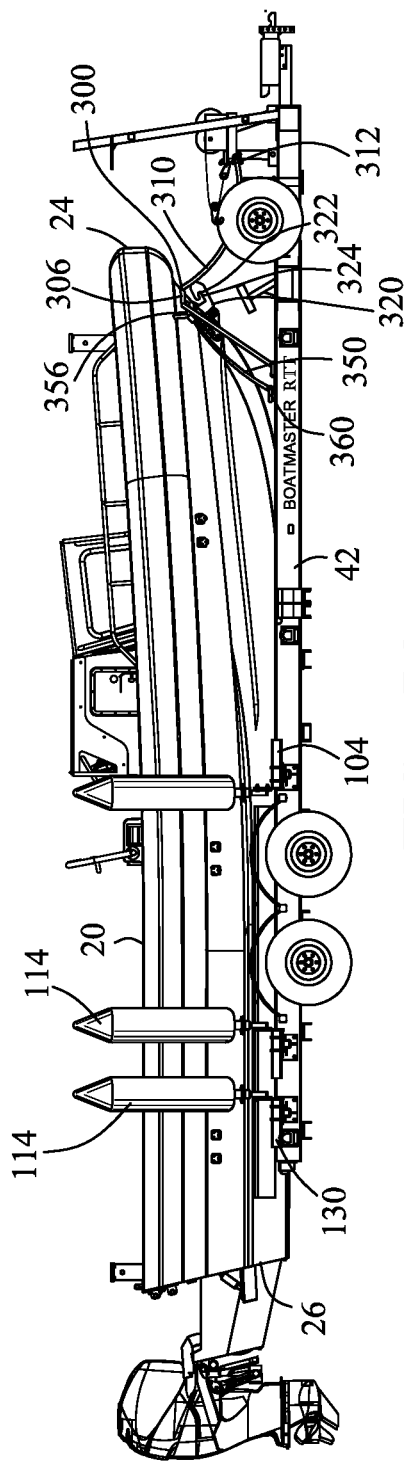
FIG. 56 is a view similar to FIG. 54 illustrating the vessel further displaced along the trailer and the vessel contacting the forward retainer cord.
Figure 57:
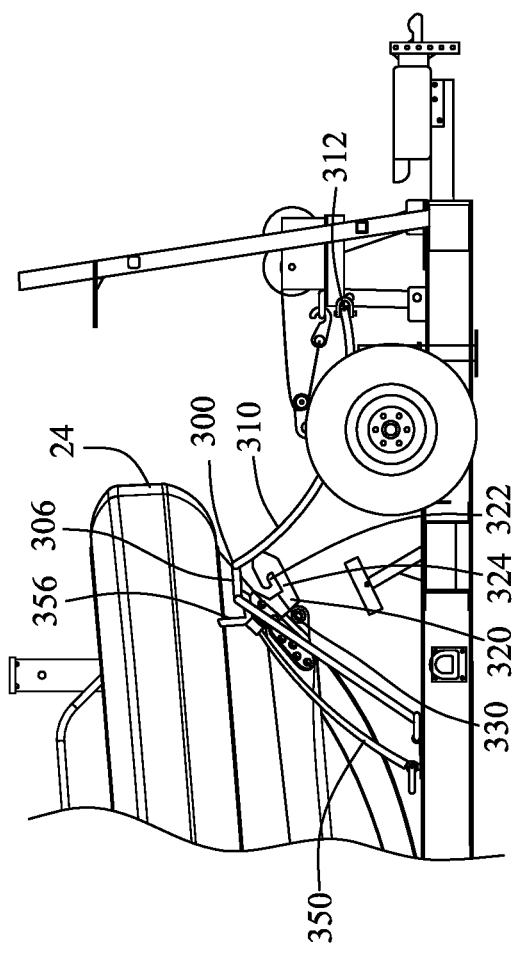
FIG. 57 is an enlarged portion of FIG. 56 illustrating the forward retainer cord being removed from the primary stanchion and the secondary stanchion.

As seen in FIG. 52, a rearward retainer cord 310 extends from a primary end 312 to a secondary end 314. The primary end 312 of the rearward retainer cord 310 is coupled to the base 40 and the secondary end 314 of the rearward retainer cord 310 is coupled to the forward retainer cord 300. The rearward retainer cord 310 may include a primary rearward retainer cord 316 and a secondary rearward retainer cord 318 (FIG. 42) coupled between the forward retainer cord 300 and the base 40. The forward retaining cord 300 and the rearward retaining cord 310 may be constructed of an ultrahigh molecular weight polyethylene material that permits the forward retaining cord 300 and the rearward retaining cord 310 to float in water if the forward retaining cord 300 and the rearward retaining cord 310 were submerged in water.

A hook 320 is coupled to the bow 24 of the vessel 20. The hook 320 includes a hook channel 322. The hook channel 322 may include a general J shape 324. The hook 320 engages the contact cord region 306 for defining a forward capture lock 332 (FIG. 58) during forward displacement of the vessel 20 over the base 40. More specifically, the contact cord region 306 engages against a forward hook stopping surface 330. Upon the forward retainer cord 300 becoming taut as shown in FIGS. 58 and 59, the forward retaining cord 300 terminates forward displacement of the vessel 20 over the base 40 for defining a forward vessel break 334.

Figure 60:
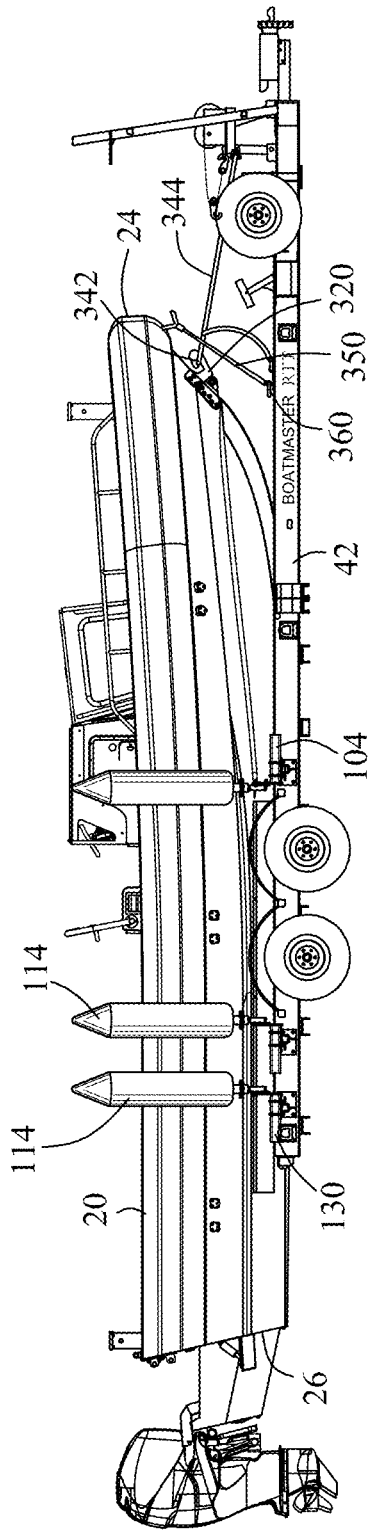
FIG. 60 is a view similar to FIG. 58 illustrating the vessel being withdrawn relative to the trailer and a rearward retainer cord coupled to the forward retainer cord.

As shown in FIGS. 60 and 61, the hook 320 engages the contact cord region 306 for defining a rearward capture lock 342 by a rearward displacement of the vessel 20 over the base 40. More specifically, the contact cord region 306 engages against a rearward hook stopping surface 340. Upon the rearward retainer cord 310 becoming taut as shown in FIGS. 60 and 61, the rearward retaining cord 310 terminates rearward displacement of the vessel 20 over the base 40 for defining a rearward vessel break 344. The forward retaining cord 300 and the rearward retaining cord 310 constructed of an ultrahigh molecular weight polyethylene material that permits the forward retaining cord 300 and the rearward retaining cord 310 to float assists in the engagement of the hook 320 with the contact cord region 306 if the forward retaining cord 300 and the rearward retaining cord 310 were submerged in water.

Figure 43:
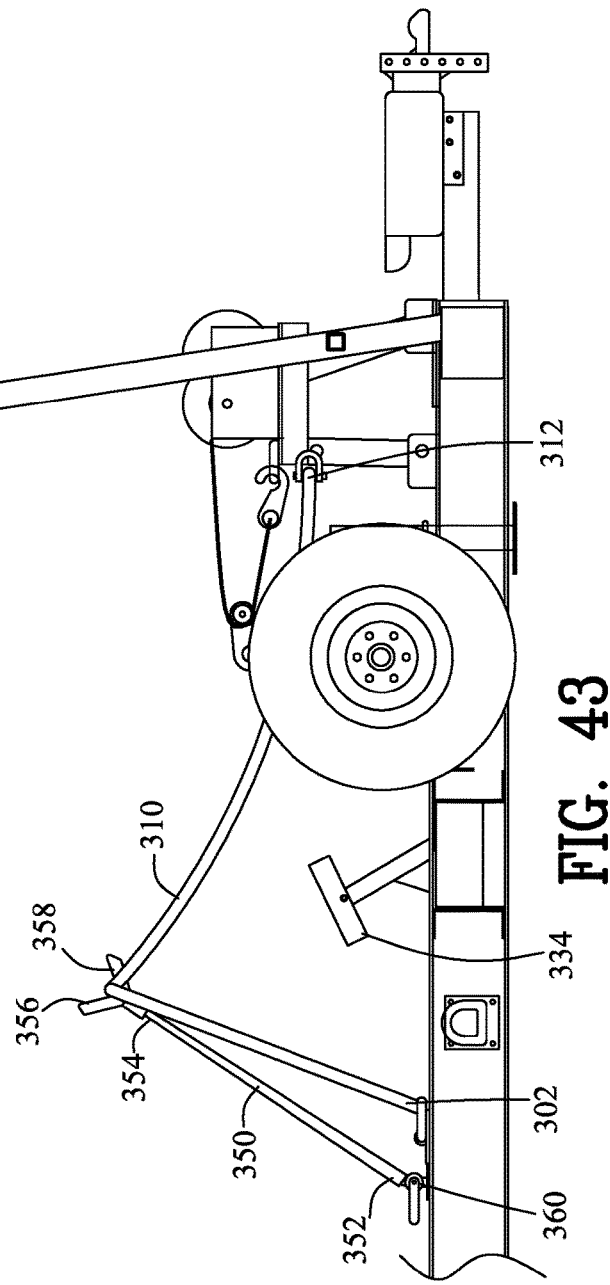
FIG. 43 is a front view of FIG. 42.
Figure 44:
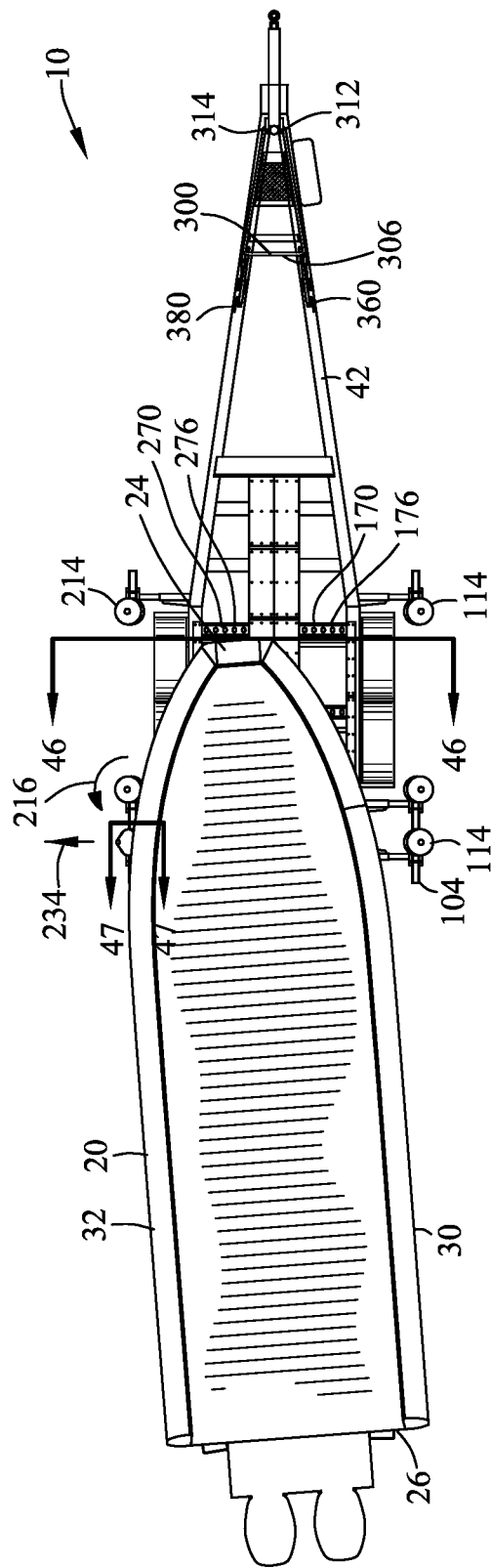
FIG. 44 is a view similar to FIG. 40 illustrating the vessel having an angular configuration relative to the trailer wherein the vessel is impacting with a plurality of upper torsion guides on the left side of the trailer and the plurality of upper torsion guides being outwardly displaced in a vertical arcuate path and being rotationally displaced.
Figure 45:
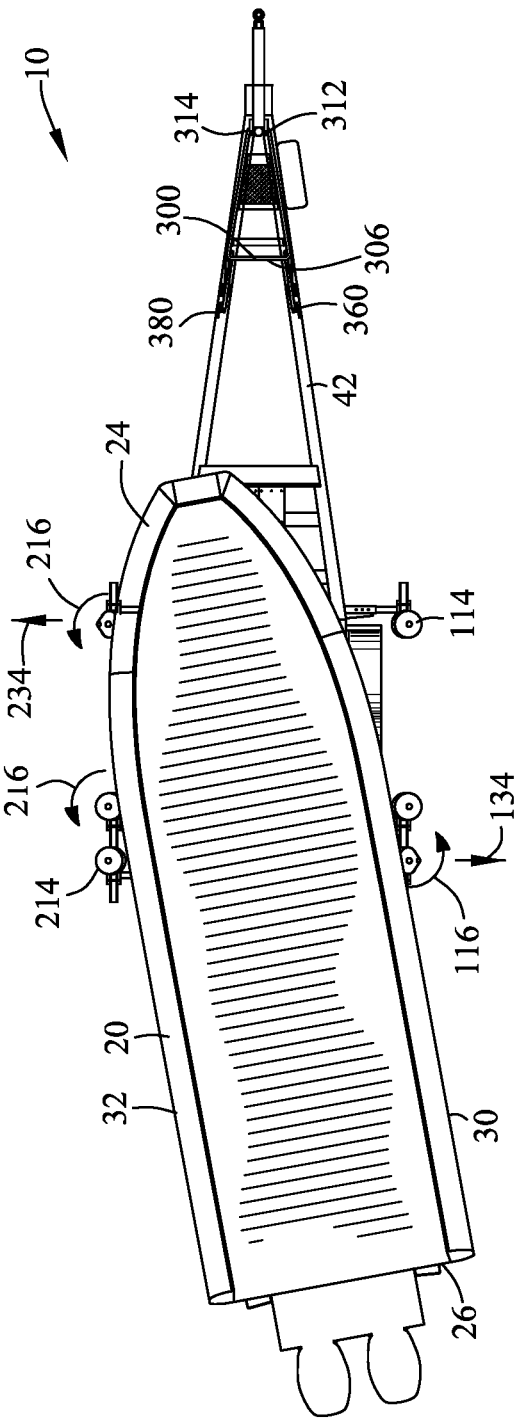
FIG. 45 is a view similar to FIG. 44 illustrating the vessel having a second angular configuration relative to a trailer wherein the vessel is impacting with a plurality of upper torsion guides on the left side of the trailer and the plurality of upper torsion guides being outwardly displaced in a vertical arcuate path and being rotationally displaced and the vessel is impacting with a plurality of upper torsion guides on the right side of the trailer and the plurality of upper torsion guides being outwardly displaced in a vertical arcuate path and being rotationally displaced.
Figure 46:
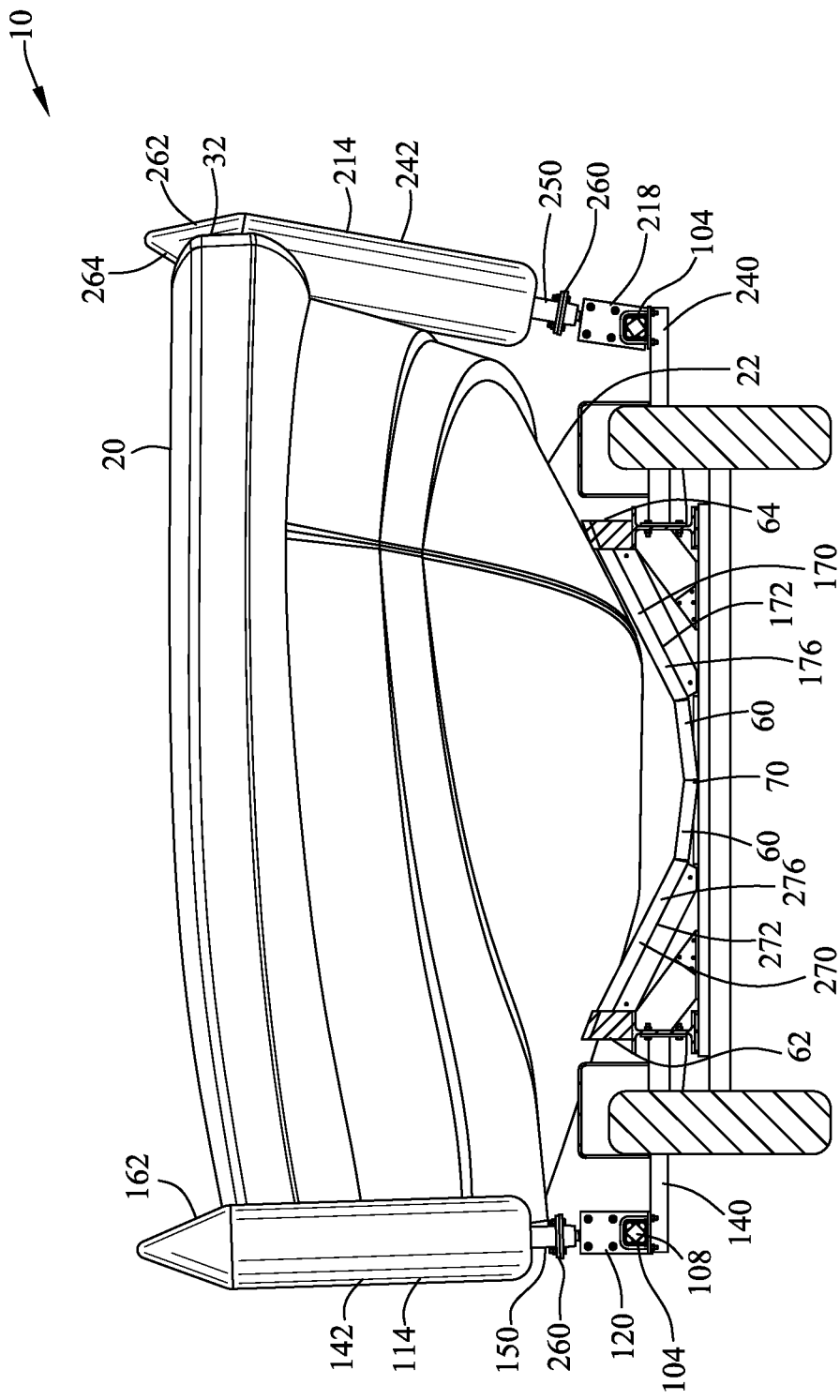
FIG. 46 is a sectional view along line 46-46 in FIG. 44 illustrating the vessel impacting with a lower guide body on the left side of the trailer and the lower guide body having a low friction coefficient and angle relative to trailer.
Figure 47:
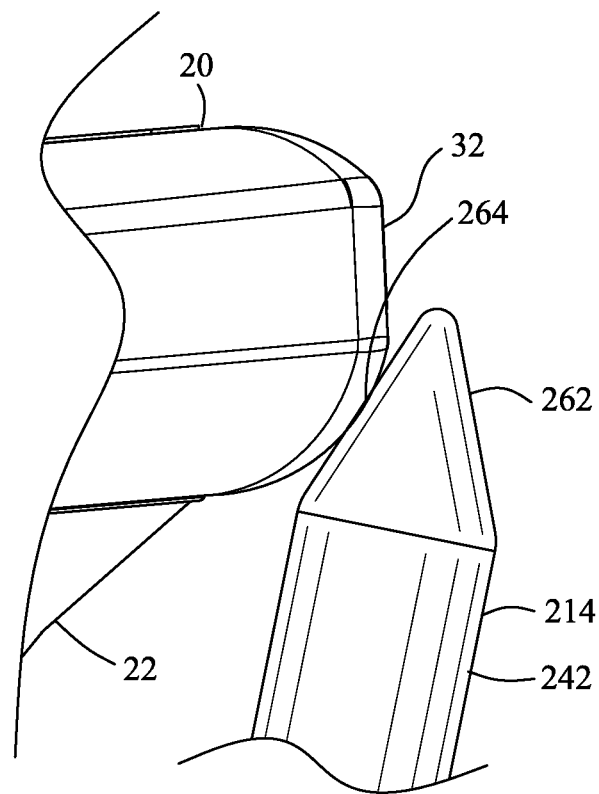
FIG. 47 is an enlarged portion of FIG. 46 illustrating a deformable collar having a deformable conical cap for engaging with the vessel.
Figure 48:
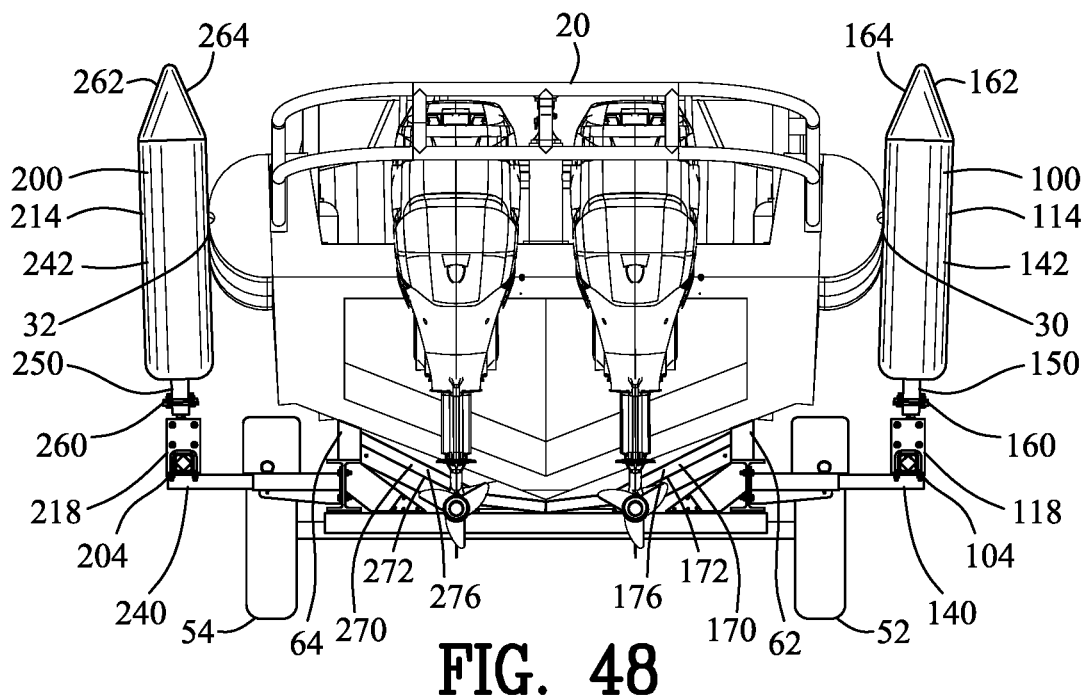
FIG. 48 is a view similar to FIG. 39 with the vessel fully engaged with the trailer and illustrating the plurality of upper torsion guides on the left and the plurality of upper torsion guides on the right side of the trailer slightly compressing against the vessel.

FIGS. 54-61 further illustrate a primary stanchion 350 extending between a proximal end 352 (FIG. 43) and a distal end 354 (FIG. 43). The proximal end 352 of the primary stanchion 350 is coupled to the base 40. A primary keeper 356 is coupled to the distal end 354 of the primary stanchion 350. The primary keeper 356 may include a general Y-shaped bracket 358 for supporting the forward retainer cord 300.

Figure 42:
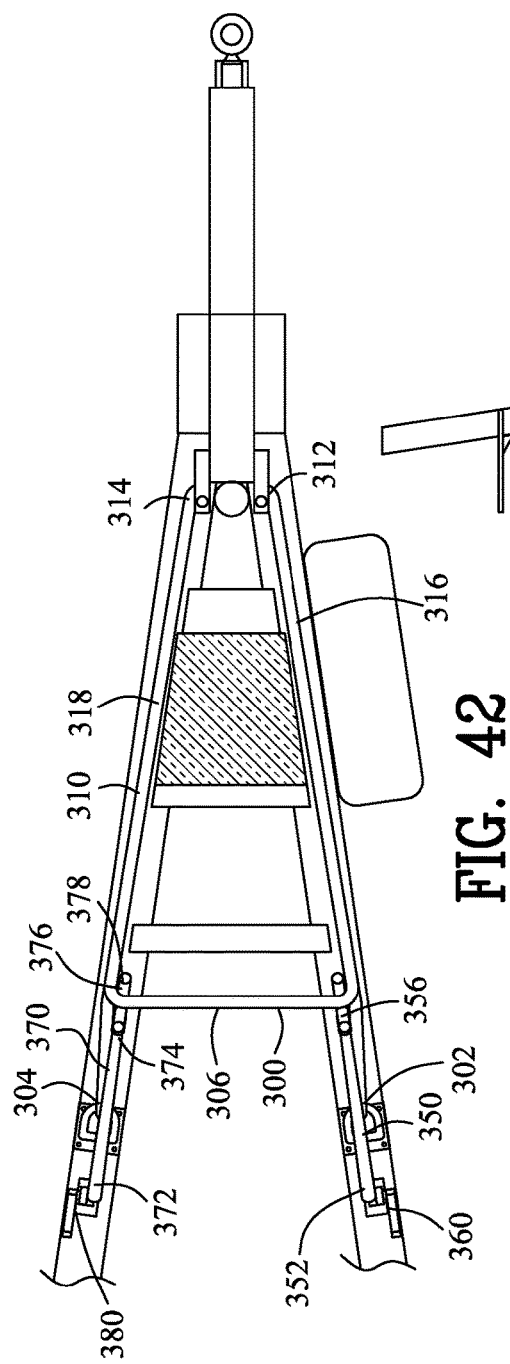
FIG. 42 is an enlarged view of a portion of FIG. 40 illustrating a cord vessel controlling device.

As seen in FIG. 42, a secondary stanchion 370 extends between a proximal end 372 and a distal end 374. The proximal end 372 of the secondary stanchion 370 is coupled to the base 40. A secondary keeper 376 is coupled to the distal end 374 of the secondary stanchion 370. The secondary keeper 376 may include a general Y-shaped bracket 378 for supporting the forward retainer cord 300.

The primary stanchion 350 and the secondary stanchion 370 may be constructed of a reinforced plastic material composed of glass fibers embedded in resin. The general Y-shaped bracket 358 and 378 may be constructed of a polymeric material.

The primary keeper 356 and the secondary keeper 376 engage the forward retaining cord 300 for elevating the contact cord region 306 above the base 40. The forward retaining cord 300 disengages from the primary keeper 356 and the secondary keeper 376 upon the hook 320 engaging the contact cord region 306 during forward displacement of the vessel 20 over the base 40.

A primary adjustable mount 360 pivotably couples the primary stanchion 350 to the base 40 for adjusting the angle of the primary stanchion 350 relative to the base 40. Similarly, a secondary adjustable mount 380 pivotably couples the secondary stanchion 370 to the base 40 for adjusting the angle of the secondary stanchion 370 relative to the base 40. The primary adjustable mount 360 and the secondary adjustable mount 380 adjust the elevation of the contact cord region 306 of the forward retainer cord 300 relative to the base 40 for aligning the forward retainer cord 300 with the hook 320.

The invention further includes a method for positioning a vessel 20 comprising the steps of displacing a primary torsion guide 100 outwardly upon the vessel 20 impacting with the primary portion guide 100 and the primary torsion guide 100 providing a primary progressive increasing counteracted force 102 for pushing the vessel 20 inwardly. The secondary torsion guide 200 is displaced outwardly upon the vessel 20 impacting with the secondary portion guide 200 and the secondary torsion guide 200 providing a secondary progressive increasing counteracted force 202 for pushing the vessel 20 inwardly. The vessel 20 is aligned by the primary torsion guide 100 and the secondary torsion guide 200 during launching and recovering the vessel 20.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A vessel controlling device for positioning a vessel, comprising:
   a base for supporting the vessel;
   a forward retainer cord extending from a primary end to a secondary end;
   said primary end and said secondary end of said forward retainer cord coupled to said base for defining a contact cord region elevated above said base;
   a rearward retainer cord extending from a primary end to a secondary end;
   said primary end of said rearward retainer cord coupled to said base and said secondary end of said rearward retainer cord coupled to said forward retainer cord;
   a hook coupled the vessel;
   said hook engaging said contact cord region for defining a forward capture lock during a forward displacement of the vessel over said base;
   said forward retaining cord terminating forward displacement of the vessel over said base for defining a forward vessel break;
   said hook engaging said contact cord region for defining a rearward capture lock during a rearward displacement of the vessel over said base;
   said rearward retaining cord terminating a rearward displacement of the vessel over said base for defining a rearward vessel break;
   a primary stanchion extending between a proximal end and a distal end;
   said proximal end of said primary stanchion coupled to said base;
   a primary keeper coupled to said distal end of said primary stanchion;
   a secondary stanchion extending between a proximal end and a distal end;
   said proximal end of said secondary stanchion coupled to said base;
   a secondary keeper coupled to said distal end of said secondary stanchion;
   said primary keeper and said secondary keeper engaging said forward retaining cord for elevating said contact cord region above said base; and
   said forward retaining cord disengaging from said primary keeper and said secondary keeper upon said hook engaging said contact cord region during forward displacement of the vessel over said base.

2. The vessel controlling device as set forth in claim 1, further including a primary adjustable mount pivotably coupling said primary stanchion to said base for adjusting the angle of said primary stanchion relative to said base;
   a secondary adjustable mount pivotably coupling said secondary stanchion to said base for adjusting the angle of said secondary stanchion relative to said base; and
   said primary adjustable mount and said secondary adjustable mount adjusting the elevation of said contact cord region of said forward retainer cord relative to said base for aligning said forward retainer cord with said hook.

\* \* \* \* \*